(12) United States Patent
Walker et al.

(10) Patent No.: US 12,044,355 B2
(45) Date of Patent: Jul. 23, 2024

(54) DISPLAY DEVICE SUPPORT ARM

(71) Applicant: Arrow Group Global Limited, Lowestoft (GB)

(72) Inventors: David Andrew Walker, West Grinstead (GB); Samuel John Nye, West Grinstead (GB); Timothy Francis, Lowestoft (GB)

(73) Assignee: Arrow Group Global Limited (GB)

( * ) Notice: Subject to any disclaimer, the term of this patent is extended or adjusted under 35 U.S.C. 154(b) by 58 days.

(21) Appl. No.: 17/422,299

(22) PCT Filed: Jan. 11, 2020

(86) PCT No.: PCT/IB2020/050209
§ 371 (c)(1),
(2) Date: Jul. 12, 2021

(87) PCT Pub. No.: WO2020/144660
PCT Pub. Date: Jul. 16, 2020

(65) Prior Publication Data
US 2022/0082206 A1 Mar. 17, 2022

(30) Foreign Application Priority Data
Jan. 11, 2019 (GB) .................................. 1900397

(51) Int. Cl.
*F16M 13/02* (2006.01)
*F16M 11/04* (2006.01)
(Continued)

(52) U.S. Cl.
CPC ........ *F16M 13/022* (2013.01); *F16M 11/041* (2013.01); *F16M 11/10* (2013.01);
(Continued)

(58) Field of Classification Search
CPC ................. F16M 11/10; F16M 13/022; F16M 2200/024; F16M 11/105; F16M 11/125;
(Continued)

(56) References Cited

U.S. PATENT DOCUMENTS 6,863,252 B2 * 3/2005 Bosson ................ F16M 11/041
248/278.1
8,070,114 B2 * 12/2011 Chen ................... F16M 11/2021
248/278.1

(Continued)

*Primary Examiner* — Bradley Duckworth
(74) *Attorney, Agent, or Firm* — William D. Hare, Esq.; McNeely & Hare, LLP

(57) ABSTRACT

A display device support arm comprises: a securing component; a first support arm element pivotally attached to the securing component and coupling to an attachment means for receiving a coupling mechanism, incorporating a load indicator, at the lower end of a second support arm element. At the other end thereof is an attachment head and a display mounting head rotatably secured thereto. The mounting head includes a toothed arcuate surface to which there is pivotally mounted a trigger adapted to move one or more locking blocks out of biased engagement with the arcuate surface. Constant friction joints, a modified securing foot with tool holder, a tilt mechanism; a display rotation lock operably coupled to a display mounting interface; interchangeable rail assemblies; display mounting brackets for attachment to the rail assemblies; and methods of installing a support arm and setting a tilt mechanism are also defined.

18 Claims, 20 Drawing Sheets

(51) Int. Cl.
*F16M 11/10* (2006.01)
*F16M 11/20* (2006.01)
*F16M 11/24* (2006.01)

(52) U.S. Cl.
CPC ..... *F16M 11/2021* (2013.01); *F16M 11/2092* (2013.01); *F16M 11/24* (2013.01); *F16M 2200/024* (2013.01); *F16M 2200/063* (2013.01); *F16M 2200/08* (2013.01)

(58) Field of Classification Search
CPC .... F16M 11/126; F16M 11/128; F16M 11/08; F16M 11/12; Y10S 248/921
See application file for complete search history.

(56) References Cited

U.S. PATENT DOCUMENTS

| | | | | |
|---|---|---|---|---|
| 10,066,785 | B1* | 9/2018 | Chen | F16M 11/14 |
| 10,180,209 | B2* | 1/2019 | Bowman | F16M 13/02 |
| 10,344,911 | B2* | 7/2019 | Mills | F16M 11/041 |
| 10,473,257 | B2* | 11/2019 | Tomomatsu | G06F 1/1632 |
| 10,845,000 | B2* | 11/2020 | Lau | F16M 11/14 |
| 11,293,584 | B2* | 4/2022 | Kleist | F16M 13/022 |
| 11,598,479 | B2* | 3/2023 | Ambridge | F16M 11/24 |
| 2010/0181451 | A1* | 7/2010 | Hsieh | B60R 11/02 |
| | | | | 248/288.11 |
| 2011/0303805 | A1* | 12/2011 | Lau | F16M 11/126 |
| | | | | 248/125.8 |
| 2022/0104367 | A1* | 3/2022 | Tivnon | A47F 5/0068 |

* cited by examiner

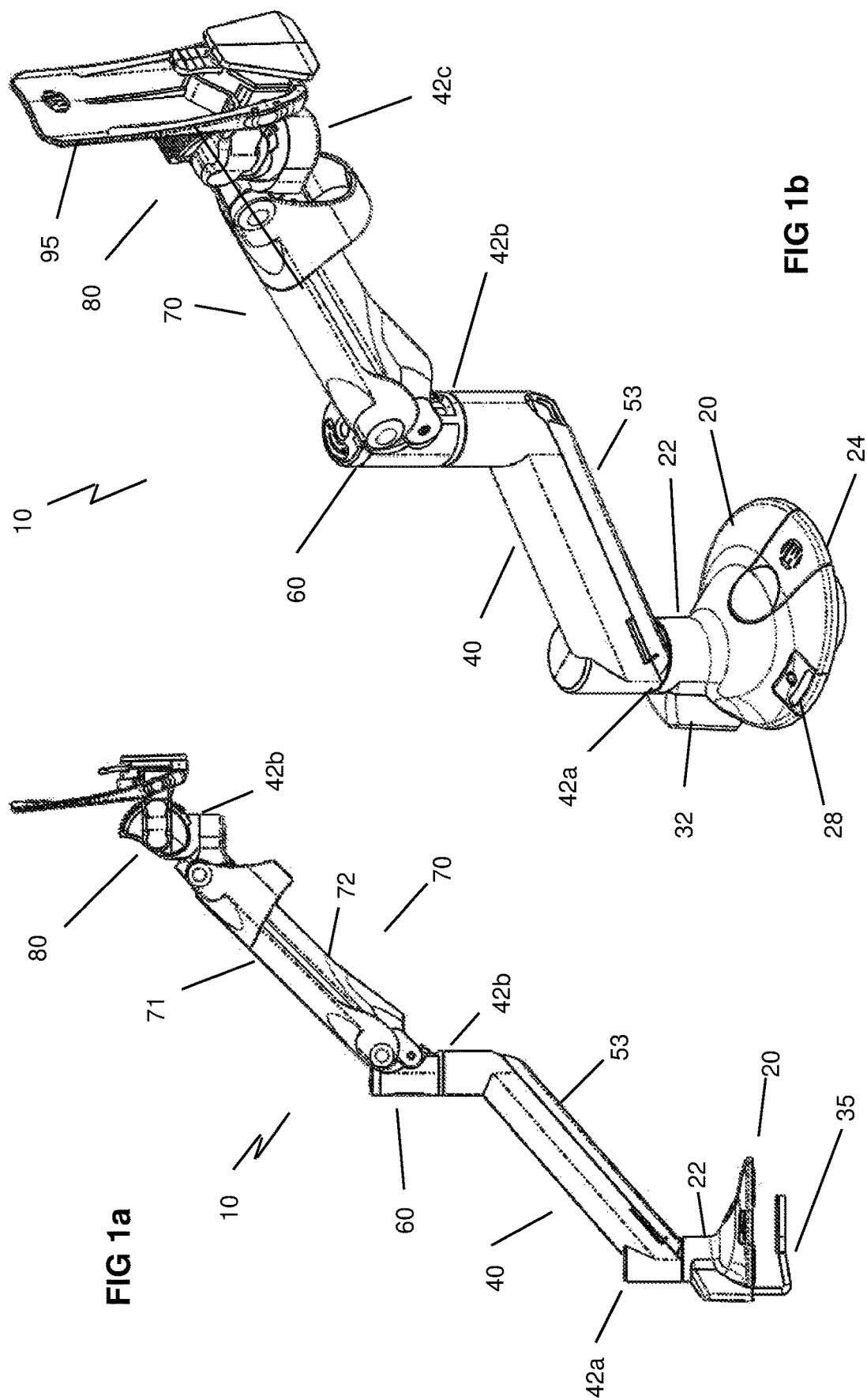

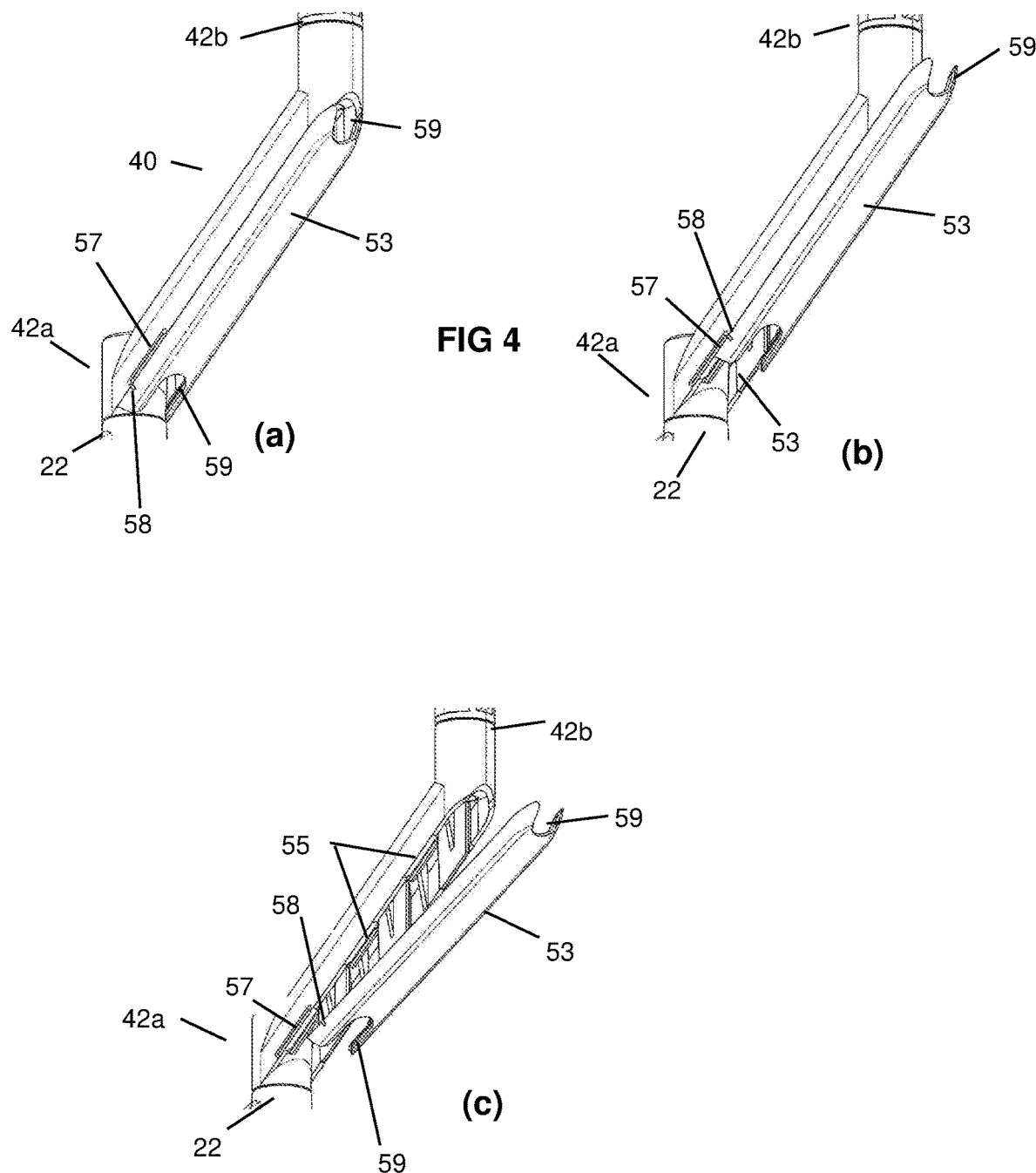

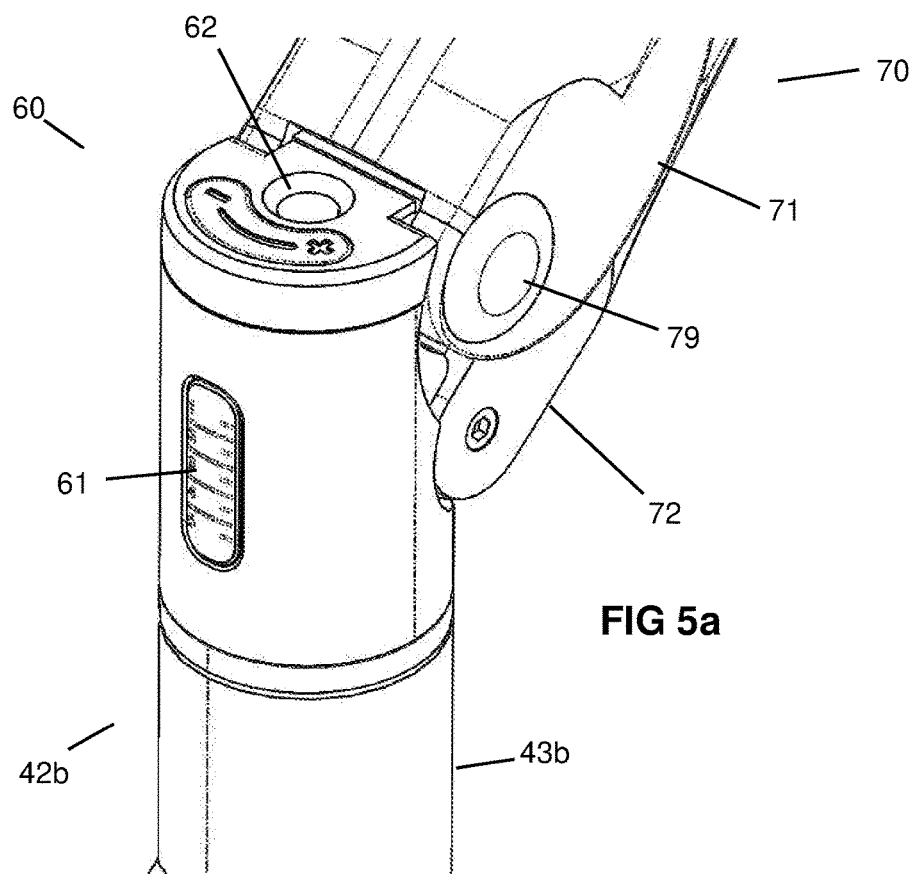
FIG 5a
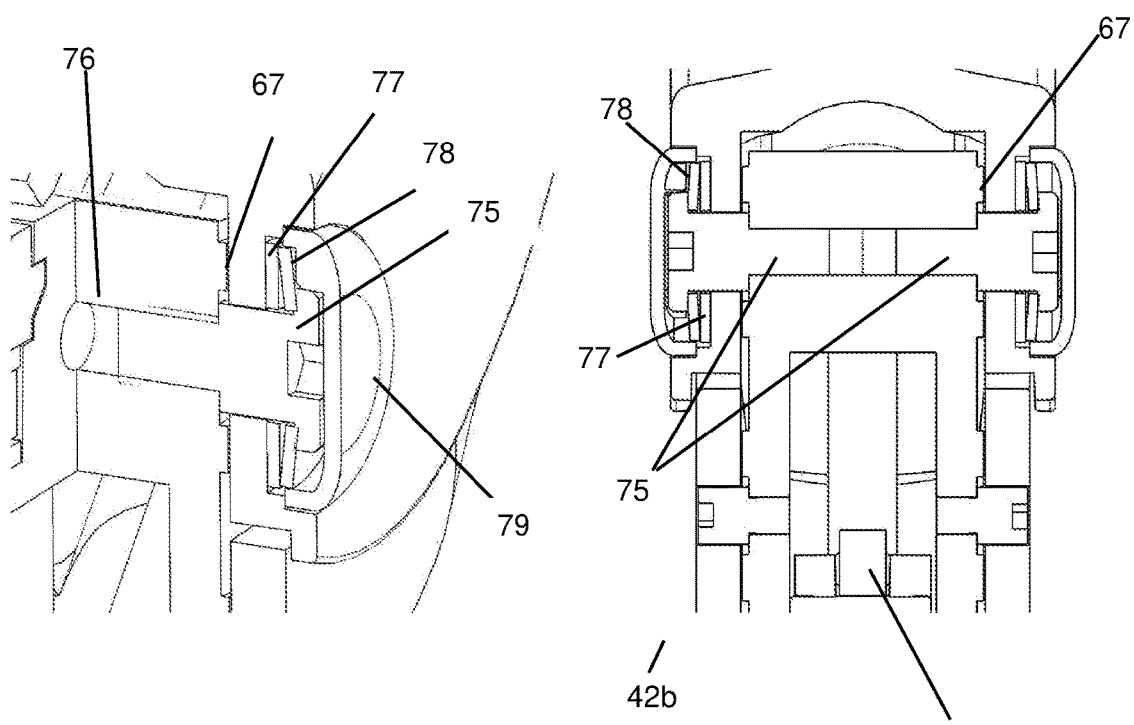
FIG 5b
FIG 5c

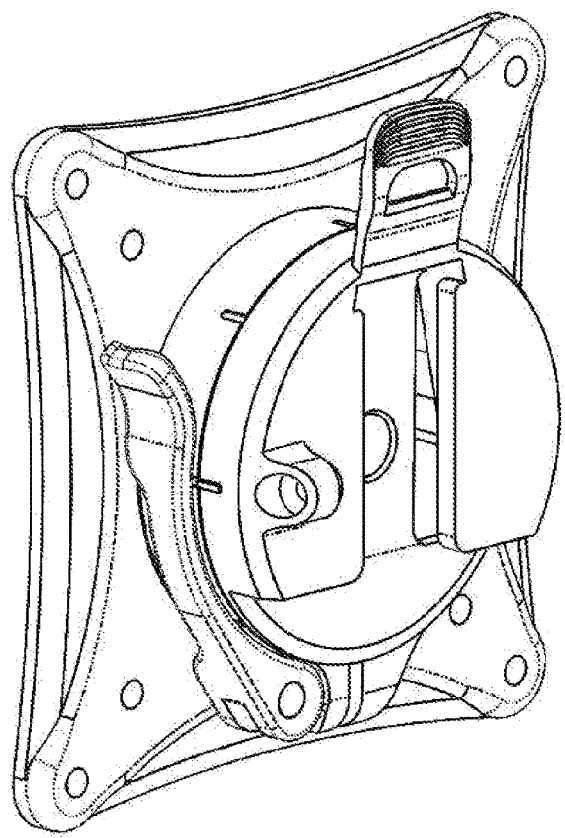 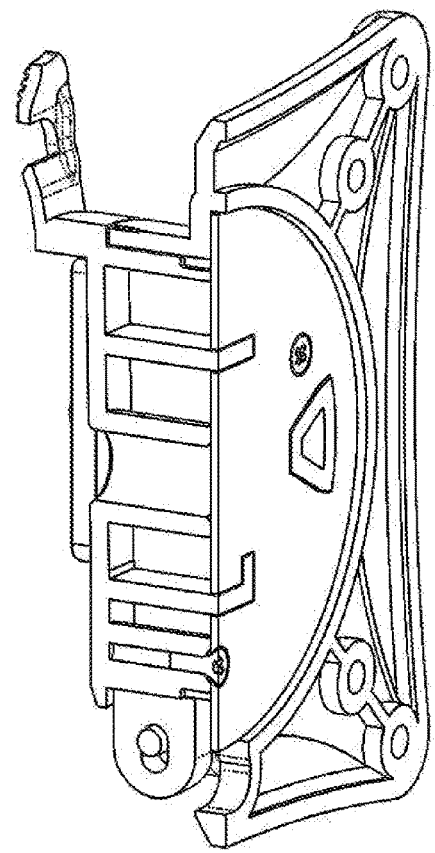
FIG 9a FIG 9b
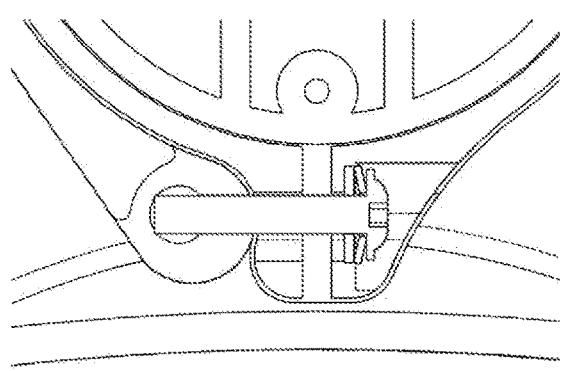 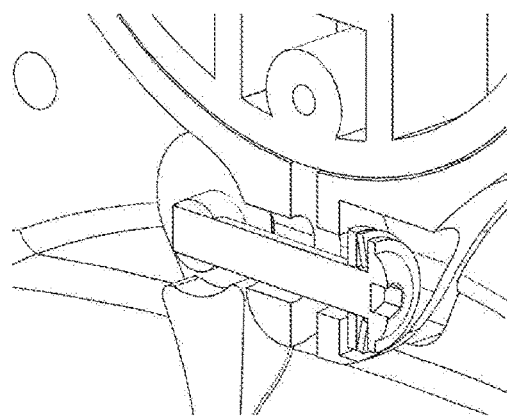
FIG 9c

DISPLAY DEVICE SUPPORT ARM

FIELD OF THE INVENTION

The present invention relates generally to support arms of the type used for display monitors and screens mounted on desks and workstations in a commercial or business environment. Support arms of this type commonly have an anchored upright from which a multi-positional arm extends to an attachment mechanism for the display or monitor.

The invention more particularly relates to a multi-positional display support arm having multi-axis manoeuvrability to facilitate swift controllable adjustment of a display device with minimal effort from one static position to another self-supported position without locking and unlocking support arm elements.

Most particularly, the invention relates to facilitating movement of a display device in three orthogonal directions and thereafter provide lockable pitch (tilt) and rotational control of said display device.

The support arm of the present invention comprises a number of discrete assemblies which are uniquely featured and, as will be described hereinbelow, secured to one another by couplings which, in themselves, have technical attributes not heretofore realised.

It is acknowledged that certain ones of the assemblies may be adapted for use with existing support arms and, as such, have a separate commercial lives. Each such assembly, identified in the detailed description, has novel features and technical advantages alluded to in the extensive prior art. Furthermore, the couplings and joints securing respective assemblies have been designed for longevity and adjustment-free use, deskilling the installation process and reducing end-user maintenance, in many instances, to zero.

It will be appreciated by the skilled addressee, that the invention, although directed to monitors and display screens, may be utilised for any purpose requiring the support of a substantially flat surface on which information may be displayed or entered.

Additionally, as screens become more multi-functional, the dual purpose of display and input, via touchscreen, can be incorporated.

Although the primary use to which the invention is applied remains the positioning and support of a display device, it is not intended to be so limited and the reader will appreciate that there are numerous further uses to which the support arm of the invention may be applied.

BACKGROUND TO THE INVENTION

As many industries and professions gravitate towards computer control, businesses generally utilise computers to conduct all transactional and information services and, as knowledge-based enterprises increasingly predominated the business landscape, the use of computer screens as visual display devices and/or input devices increases. One of the areas of expanding use is in call centres and centralised distribution centres where online retailers accept and process telephone and online orders.

With this increase in computer and display screen use, is a corresponding increase in sedentary behaviour where users spend many continuous hours in front of a display screen. Accordingly, attention is now directed to the ergonomics of all equipment used in such environments to avoid posture-related health problems, predominantly back strain, muscle spasm, repetitive strain injuries, carpal tunnel syndrome and fatigue leading to stress.

It is well known that correct posture and a relaxed stance is more beneficial than adopting one's body to awkward positions leading to onset of fatigue and muscle strain. A common result of long-term lower back immobility or spasm of the piriformis muscle is the trapping of the sciatic nerve leading to numbness, tingling or pain down the legs of the user. By keeping the spine in a neutral position, fatigue, pain and injury can be avoided or lessened.

One of the best methods known to encourage a neutral position of the spine is by elevating a monitor or screen to a natural eye level when either in the sitting or standing position. This also avoids muscle strain in the neck as a head is tipped forward, such strain often being transferred to the lower back.

As the use of cathode ray tube (CRT) based monitors and screens is phased out (slowly in the case of industrial automation and in hospitals and other medical environments) and lighter flat screen display devices become more prevalent, the use of support arms having increased manoeuvrability becomes more common. This has meant that arms supporting horizontal platforms on which monitors are placed, such as that exemplified by the disclosure of U.S. Pat. No. 6,012,693 (to Voeller et al.) and monitor suspension systems such as that disclosed in U.S. Pat. No. 4,836,478 (to Sweere), have become superfluous.

It will be understood that certain terms used in the description which follows are intended to describe specific situations and should not be interpreted as limiting of the scope of the invention or its use. The phrase "display device" is used to indicate any device or surface on which information may be presented or displayed whether physically or electronically. Its use is intended to be interchangeable with "monitor" or "screen" and includes touchscreens and input devices having visual instruction within display elements.

Although the nature of or technology used in a display device is not critical, the invention is directed particularly towards flat screen displays for which there are standard mount interfaces. Accordingly, in the description that follows the acronyms FDMI (flat display mounting interface) and VESA (Video Electronic Standards Association) are used interchangeably in respect of the display mount.

Over the years there have been many varieties of VESA mounts and interfaces for VESA mounts presented to the marketplace, only some of which have met with any degree of success. As it is notoriously difficult to secure VESA mounts to the backs of display devices in-situ it is advantageous to have an interface which allows the VESA mount to be secured to the display device and releasably clipped to the support arm by a locking interface. By providing a mount interface between the display head of a support arm and the VESA mount, a degree of interchangeability is facilitated and, as will be shown hereinafter, the support arm may be converted from a single device support arm to a multi-device support arm, where a plurality of devices is conveniently attached to a horizontal rail.

In the preferred embodiment of the present invention, the support arm is adapted to be locked to a table, desk or workstation via a securing foot, however, this is not essential to the working of the support arm which may be fixed to any stable surface.

Means for securing a support arm to a floor, upright (or angled) pole or a wall are known from the prior art and include brackets, hinges, joints and various other fixings, including wall-mounted rail systems, floor stands and wheeled caddies, which provide little added functionality to the support arm as a whole.

Accordingly, the term "stable surface" is intended to include any surface to which a "securing component" or "securing mechanism" may be attached with the expectation that the weight of the support arm and the or each display device supported thereby, whether static or being moved by and end-user, will be accommodated without failure or instability.

The prior art is replete with the display device support arms of one type or another with the various methods employed to provide sufficient support or to ensure positional security once placed. Of the more modern and sophisticated solutions are those support arms that use frictional axes and gas struts to maintain positional surety once the display is correctly placed. Proper balance and accurate construction facilitate light pressure being applied by a user to move the display and arm from one position to the next where, without locking of the arm, the display will maintain its position.

European Patent Application Publication No. EP 1 139 003 (to Bosson) describes a typical early style monitor arm having a vertical post to which a horizontal support arm is pivotally attached at height adjustable intervals defined by locking recesses with in the post. The horizontal support arm includes a pivot joint along its length and a bracket at its free and to receive a monitor mounting head attachable to a monitor mount. Multiple arms are attachable to the upright post and power and data cables are suspended under the or each support arm and to the upright post using clips.

Bosson is silent as to how the post is secured or attached to a stable surface.

International Patent Application Publication No. WO 2008/012368 (to Wills et al) follows on from the Bosson disclosure in that it describes a mounting bracket for securing the vertical post on which the support arm is mounted to the surface of a wall or partition panel in which there are provided at least a pair of spaced apart parallel channels into which clamping members operably engage.

The requirement for more functional, adaptable and aesthetically pleasing support arms has driven the development of display support arms which have fluidly movable elements with adjustable motion resistance and lockable, quick-release joints, combining intuitively adaptable configuration, advanced design aspects, together with the convenience of, for example, integrated cable routing.

To provide the user experience required, it is necessary to provide a means for, independently of the support arm, altering the pitch (tilt angle) of the display screen and to ensure the screen is stabilised in its new position. An enhancement of this facilitates the rotation of the screen, for example, from a landscape to a portrait orientation, without altering the overall position or pitch of the screen.

In currently available support arms where a tilt function is provided, the screen is positioned using compression of friction surfaces to limit movement or stabilise an acquired position. Many complex and multi-component arrangements are disclosed in the prior art and most all are prone to wear or require user adjustment throughout the life of the support arm. Certain earlier disclosures, such as that exemplified by United States Patent Application Publication No. US 2001/050327 (to Sweere et al.), describe ratcheting arrangements to provide for rotational repositioning of a mounting plate about a horizontal axis.

United States Patent Application Publication No. 2011/0303805 (to Lau et al.) details in its preamble many of the disadvantages associated with preceding (and many still current) support arm systems. One of the perceived disadvantages highlighted is with the known four-bar or parallelogram linkage arm arrangements which are often bulky and unsightly. To avoid this and to account for the varying torque and loads experienced at the many pivot axes, a compression spring is provided which must be manually adjusted during installation to account for the anticipated loads.

In the construction disclosed, there is provided a means for preloading the compression spring where "the force adjusting screws 30 is held by a screw holding element 52". The adjustment is visible as a load indicator through a window formed in the arm casing. In most modern support arm arrangements, the compression spring has been superseded by a gas strut.

The disclosure also describes a display device mounting element comprising an arcuate hook which is slidably secured to the support arm via plastic mouldings each having bearing surfaces which are clamped around the hoop to define a motion joint for pitch angle (tilt) control.

An alternative motion joint is described in United States Patent Application Publication No. 2010/0084527 (also to Lau et al.) for facilitating independent movement of a display device with respect to the main support arm elements. The joint has a high component count including multiple bearing services requiring maintenance and adjustment during the product lifetime.

Thus, the primary components and adjustments required of a display device support arm of the type to which the present invention is particularly directed are:

a securing component to attach the arm to a stable surface such as a desk, workstation, wall or floor;

a first support arm element pivotally secured to the surface securing component at a lower end and an attachment upright and coupling mechanism at the upper end thereof;

a second support arm element pivotally attached at a lower end to the coupling mechanism secured to the attachment upright of the first support arm element and an attachment receiver at the other end thereof; and a display mounting head engaged to the attachment receiver of the second support arm element and adapted to receive either a flat display mounting interface (FDMI) of the type also known as a VESA mount or a rail mounting head to which one or more VESA mounts are attached.

Where a counterbalance type support arm is not particularly required, the first support arm element need not be pivotally secured to the stable surface securing component, which can be selected from any of the know components or mechanisms.

The skilled addressee will also appreciate that there are numerous design demands, cost control pressures and market forces which preclude the use of optimum engineering techniques to provide a well-constructed and finely balanced support arm that has good durability. More commonly, poor manufacturing tolerances, low-grade materials and the use of stock components mean that vertical axis rotary joints rock and horizontal axis friction joints lose their ability to hold the weight of a display device as components wear with age and use. Ongoing maintenance of support arms becomes a necessity and user adjustment of critical weight-bearing or friction joints is unreliable.

There are many instances where it is advantageous to support two display devices either in a side-by-side or over-and-under configuration. Where a second display device is an adjunct to the primary display device, means for attaching the second device to the first may suffice. Exemplary of such systems are those disclosed in International Patent Application Publication No. WO 2013/056115 (to Funk et al.), where a lightweight display device is attached to a primary monitor via a support bracket having a VESA mount attachment and a clamping member for securing the lightweight device to the monitor, and in International Patent Application Publication No. WO 2017/058537 (to Akharas et al.), where an attachment mechanism for securing a secondary display device to a primary device includes means for altering the angle of the second device with respect to the first.

Where the size, weight or primacy of the devices are equal, a more comprehensive approach is required. U.S. Pat. No. 8,596,599 (to Carson et al.) discloses an apparatus for and method of mounting a plurality of display monitors where the monitors may move in unison to accommodate the visual preferences of all users. Each monitor is attached via a VESA style mount to a mounting bracket which attaches to a rail. Each rail may have one or more support post. The mounting bracket includes angle adjustment means which must be individually adjusted and set during installation which requires a significant amount of time and installer skill.

International Patent Application Publication No. WO 2008/091998 (to Saez et al.) discloses a support system for multiple display devices and office accessories and emulates the curvilinear arrangement of the Carson disclosure using a sectional rail onto which VESA mounting brackets may be fixed. The or each rail is mounted to a support post or a horizontal support arm which is in turn mounted to a post. Tilt adjustment of each display device is difficult and time consuming and the integrity of the support system is questionable.

As will be readily appreciated from the patent literature, there are many different approaches taken to solving some of the technical disadvantages. Each area presents specific concerns, however, many aspects are common and will be addressed hereinafter.

It is well appreciated that the currently methods of support arm and display device installation, particularly for large volume business installations, are overly time consuming and are often inconsistent in that there are few reference points for an installer to use reliably so as to replicate the torque settings on various friction joints, pre-load adjustment on spring or gas strut arm elements and the angles required for mount interfaces or display brackets.

Due to the skill required of an installer, this phase of a call-centre refit, for example, can add significantly to the cost of the installation.

It will also be seen that when it comes to fixing display devices on the support arms in a new installation there is additional skill required in the handling and fitting of display devices to newly installed arms. Where pitch angle or tilt mechanisms are provided on the support arms, it is essential that these are consistently and regularly positioned across the installation to achieve optimum reliability and satisfaction to the end users.

It is an object of the present invention to seek to obviate the primary disadvantages associated with prior art constructions of display device support arms.

It is also an object of the present invention to provide an improved support arm having multi-axis manoeuvrability and swift adjustment of a display device with minimal effort from one static position to another self-supporting position.

It is yet a further object of the invention to provide lockable pitch (tilt) and rotational control of one or more display devices on a support arm.

It is a yet further object of the invention to provide a range of components of a support arm which provide enhanced reliability and control of the axes of movement of a support arm.

It is an additional object of the invention to provide friction joints on a support arm having adjustable resistance to rotation but which in use provide repeatable, reliable arm element support and having a component life which vastly exceeds the anticipated operational life of the support arm to which it is fitted.

It is further an object of the present invention to provide a simplified method of installation of a support arm to facilitate more rapid large volume installs.

It is a yet further object of the invention to reduce significantly the labour and time overhead of tasks associated with the installation of a large number of support arms for display devices in a commercial setting.

The variants of the fittings of the invention and the uses to which they are applied are not intended to be taken as limiting, merely illustrative of the typical scenarios within which the fittings and methods of installation of the invention are adapted for use.

SUMMARY OF THE INVENTION

The present invention provides a display device support arm of the type comprising:
- a securing component adapted to secure the arm to a stable surface;
- a first support arm element attached to the securing component at the lower end and coupling to an attachment means at the other end thereof;
- a second support arm element having a coupling mechanism at a lower end for securing the arm element to an attachment means associated with the first arm element and at the other end thereof having an attachment head; and
- a display mounting head securing the attachment head of the second support arm element,
- in which the display mounting head defines a toothed arcuate surface against which correspondingly toothed blocks are brought into and out of engagement via a user actuated trigger release to controllably alter the pitch (tilt) of the head and any mount interface and/or display device mounted thereon.

Conveniently, the securing component may be selected from a post, a wall bracket, a table or workstation clamp; a wheeled caddie or a ground-engaging plate. Ideally, the first support arm element is pivotally attached to the securing component.

Advantageously, the display mounting head comprises:
- a pivot stud to engage a corresponding receiver in the attachment head of the second support arm element;
- a toothed arcuate surface to which there is pivotally mounted a spring trigger adaptor to move one or more toothed locking blocks out of biased engagement with the arcuate surface; and
- a display rotation lock operably coupled to a display device mounting interface (FDMI).

Preferably, the display mounting head includes a mount interface adapted to engage a receiver formed within the rotational lock whereby when disengaged the lock facilitates rotation of the display device mounting interface and any display device mounted thereon.

The display rotation lock additionally comprises an annular cam actuated locking mechanism having a substantially annular body on which there is provided a push tab to rotate the annulus from a locked position, where cams on the internal periphery thereof engage a corresponding surface of the display rotation lock, to an unlocked position where a trigger release allows the flat display mounting interface (FDMI) to rotate.

Alternatively, the display rotation lock comprises an annular clamp having an over-lever actuated locking mechanism which in a locked position provides an inwardly directed radial force which acts on a peripheral surface of the display rotation lock and in an unlocked position allows the display device mounting interface to rotate.

Optionally, the display device mount interface operably couples to a support arm mount adaptor for a rail assembly on which two or more display mounting interfaces are provided.

In a further aspect of the invention, the first support arm element includes a channel within which power and data cables are retained and held in position by a removable cover having a plurality of index tabs adapted to engage corresponding receivers on the peripheral edges of the channel.

The tab receivers are spaced apart to allow the cover to be removed by sliding it upwardly, in a direction parallel to the longitudinal axis of the arm, a distance corresponding to the length of one receiver, the distance being indicated for the user by visual representation on the lower edge of the support arm element adjacent channel and a corresponding reference mark on the cover.

The cover further defines apertures at each end thereof for the passage of cables but retaining the cables within or proximate the support arm.

Regular flexing of cables when moving a support creates stresses within the cables which can, over time, lead to their failure. Where cables are tightly restrained, further stresses occur leading to more rapid of failure. It is well known to loosely route cables through channels however, access is often limited.

The invention further provides a securing component for attaching the display device support arm to a stable support surface, such as a desk, workstation, wall or floor, the securing component comprising an upper body having a support surface engaging underside and
 a cylindrical tubular stud adapted to provide pivotal engagement with a correspondingly shaped receiver disposed at the lower end of a first support arm element and having an axially disposed aperture for receiving a fixing bolt having a threaded end length adapted to engage a clamp member which is drawn towards the underside of the upper body to fix the securing component to the stable surface.

The underside of the upper body is provided with a plurality of surface engaging pads to aid grip thereto.

An anti-slip surface may be provided on the clamp member in the region where it engages the stable surface.

The securing foot includes a region in the upper body thereof for slidingly receiving a tool holder. Allen keys (hex wrenches) are secured within the holder for subsequent use or for repositioning the support arm on the stable surface or for adjustment, if required.

The upper body of the securing foot optionally also includes inter-engaging cut-outs which facilitate the routing of cables through the body of the foot and for providing a neat routing aperture therein.

In a further aspect of the invention, there is provided a tilt mechanism for a display device support arm, the mechanism comprising:
 a pivot stud portion adapted to engage a corresponding receiver of a rotary joint;
 an arcuate toothed surface having an axially disposed pivot;
 a display head mount interface operably secured to the pivot for rotational movement with respect to the arcuate surface;
 a spring trigger adapted to move at least one toothed locking block out of biased engagement with the arcuate surface to facilitate said rotational movement; and
 a clutch mechanism mounted on said pivot to prevent uncontrolled rotation of the display head mount interface under gravity.

Conveniently, the pivot stud portion includes a control surface to prevent over-rotation of the tilt mechanism with respect to the corresponding receiver of a support arm element.

Advantageously, the display head mount interface operably engages a rotational lock to releasably facilitate rotation of a display device.

Optionally, the display head mount interface operably engages a mount adaptor for a rail assembly on which two or more display devices may be mounted.

In a preferred embodiment, the tilt mechanism includes a pair of toothed locking blocks biased to engage the arcuate surface, each block having independent biasing springs and having toothed surfaces offset from one another to provide increased positional pitch control.

Pitch control is provided when the teeth of one of said pair of locking blocks intermeshes with the toothed profile of the arcuate surface while the remaining block is offset and the respective teeth abut.

In an additional aspect of the invention there is provided a rail assembly for a display device support arm, the rails assembly comprising:
 a support arm mount adaptor;
 a support rail secured to the support arm by the mount adaptor and having spaced apart parallel receiver slots along the length thereof; and
 at least one display device mounting bracket having upper and lower, fixed position, engagement profiles, in which the support arm mount adaptor lockingly engages the mounting head mount interface of a support arm without modification and ensures full positional functionality of the support arm.

Ideally, the mounting head interface comprises a profiled male locking block adapted to engage releasably a corresponding female receiver in the support arm mount adaptor.

Optionally, the mounting head interface comprises a VESA mount and the support arm mount adaptor includes mounting holes therefor.

Advantageously, the mount adaptor comprises a single bolt fixing to eliminate rotation of the support rail with respect to the support arm.

Conveniently, the mount adaptor includes a handle for positioning the rail mechanism utilising the axes of movement of the support arm without making manual contact with the support arm elements.

It will be appreciated that the pitch angle of display devices mounted on the rail can be altered in unison via the tilt mechanism described hereinabove.

There is yet further provided a display device mounting bracket adapted to engage a support rail of a rail assembly, the mounting bracket comprising:
 a first part having said slot engagement profiles and a locking nut to engage and release a second part which is pivotally attached to the first part adjacent the lower of said slot engagement profiles to facilitate pitch angle (tilt) adjustment of a display device attached to the bracket via a third part which includes a mount interface rotatably secured within a stud receiver on said second part.

Advantageously, the second part has a control slot engaging a bolt of the locking nut to limit the upper and lower extent of pitch of the mounted display device.

Conveniently, indication means are provided on the bracket to provide a ready tilt reference to an installer or end user.

In a yet further aspect of the invention there is provided a constant friction joint comprising:

a first body portion having a threaded aperture, a locking surface and a bearing surface;

a second body portion rotatably movable with respect to the first body portion and having an unthreaded aperture about which, on an interior peripheral land thereof, has a bearing surface corresponding to the bearing surface of the first body portion, and, on an exterior peripheral land thereof, has a first load bearing washer and a second spring washer; and a shoulder bolt defining an inferior shoulder adapted to lock against the locking surface of the first body portion and a superior shoulder adapted to bear against the spring washer so as to transfer a constant force against the exterior peripheral land and thereby provide a constant rotational friction within the joint irrespective of component wear over product lifetime.

The present invention also provides a method of adjusting the pitch angle (tilt) of a display device, the method comprising:

providing a tilt mechanism on a display device support arm, the mechanism having an arcuate toothed surface and an axially disposed pivot, on which there is mounted for rotation therewith a display device mount interface and a spring trigger adapted to move at least one toothed locking blocks out of biased engagement with the arcuate surface to facilitate said rotational movement, operating the spring trigger to disengage a locking block from the arcuate surface;

manually positioning the display device to the required pitch angle; and releasing the spring trigger to re-engage one of the locking blocks with the arcuate surface.

In a final aspect of the invention there is provided a method of installing a plurality of display device support arms, the method including:

mounting a securing component to a stable surface;

fixing a first support arm element to a second support arm element via a rotary joint associated with a coupling mechanism;

pre-loading a biasing actuator of the coupling mechanism to control the movement of the second support arm element under load;

noting the load setting on an indicator provided on the coupling mechanism;

mounting via a rotary joint a display mounting head having associated therewith a display mount interface, the display mount head further comprising a tilt mechanism having an arcuate surface and trigger-released locking blocks;

noting a selected tilt angle;

selecting one of a single display device having a VESA mount associated therewith for receiving the mount interface of the display mounting head or a mount adaptor for locking a rail assembly having two or more brackets attached thereto, each bracket having display mount interfaces for engaging corresponding VESA mounts of respective display devices;

where a rail assembly is used, noting the tilt angles of the respective brackets;

securing the assembled support arm to the securing component; and repeating the above actions for each display device support arm of the installation, utilising the established tilt angles and load settings.

BRIEF DESCRIPTION OF THE DRAWINGS

The present invention will now be described more particularly with reference to the accompanying drawings which show, by way of example only, a display device support arm, together with details of preferred embodiments of assemblies and components, which in combination define the preferred construction of support arm in accordance with the invention. In the drawings:

FIGS. 1a and 1b are a side elevation and a perspective view respectively of a display device support arm of the invention having an interface to which a VESA mount for a single display device or a rail mount adaptor for a rail assembly may be mounted;

FIGS. 4a to 4c are elevations of the first support arm showing a cable routing channel and a cover therefor;

FIGS. 5a to 5k are elevations of a coupling mechanism having a load adjustment indicator adapted to attached to the lower support arm and elevations of the linkage components comprising the second support arm element;

FIGS. 9a to 9c are elevations similar to those of FIGS. 8a to 8c in which the rotational lock is released from a locked position to an open position to facilitate rotation of the VESA mount by an over-lever actuator;

DETAILED DESCRIPTION OF THE DRAWINGS

Figure 2A:
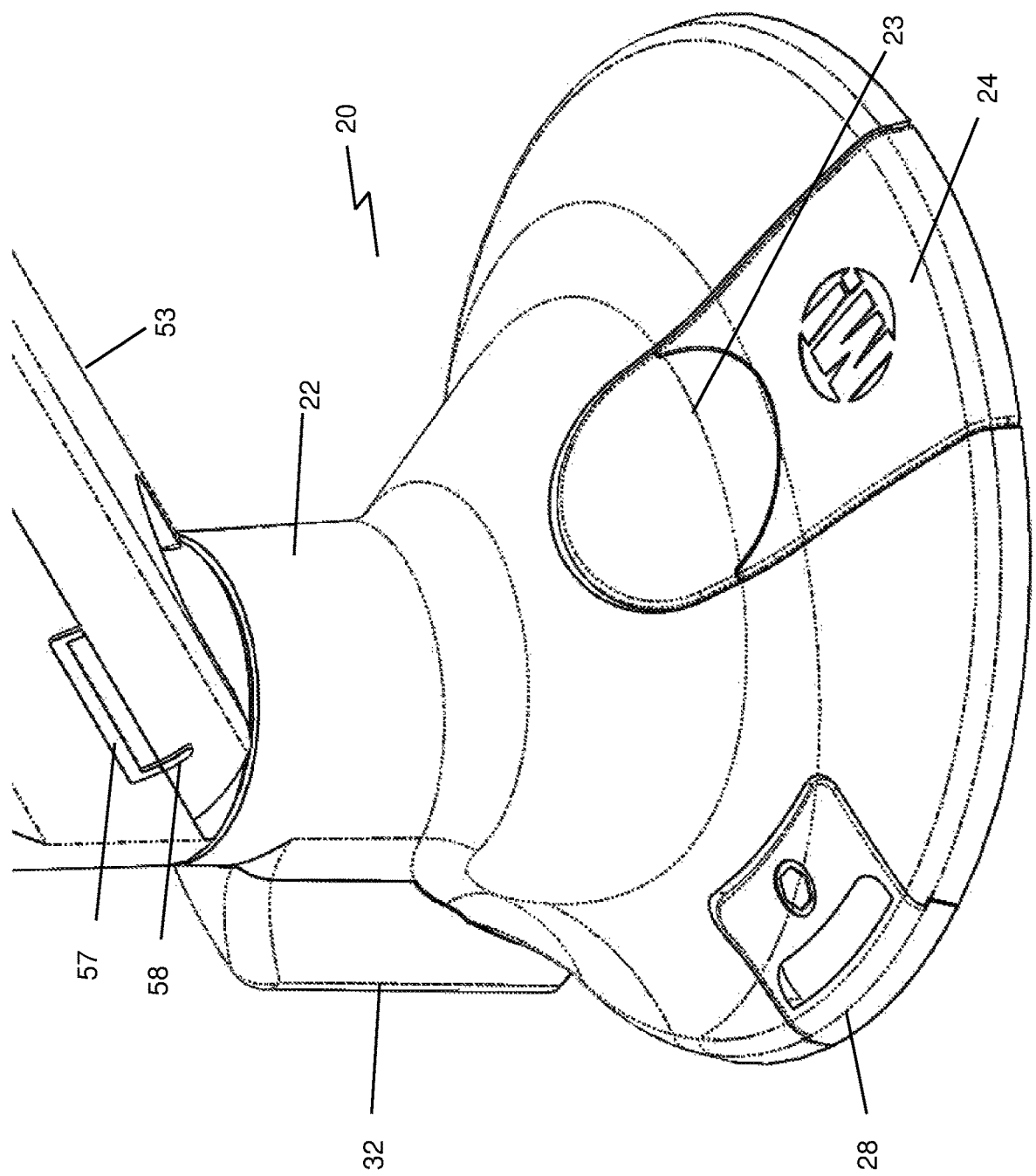
FIGS. 2a to 2h are perspective elevations of a support arm securing foot having an integral surface attachment means and removable sections for cable routing and an integrated adjustment tool carrier.
Figure 2B:
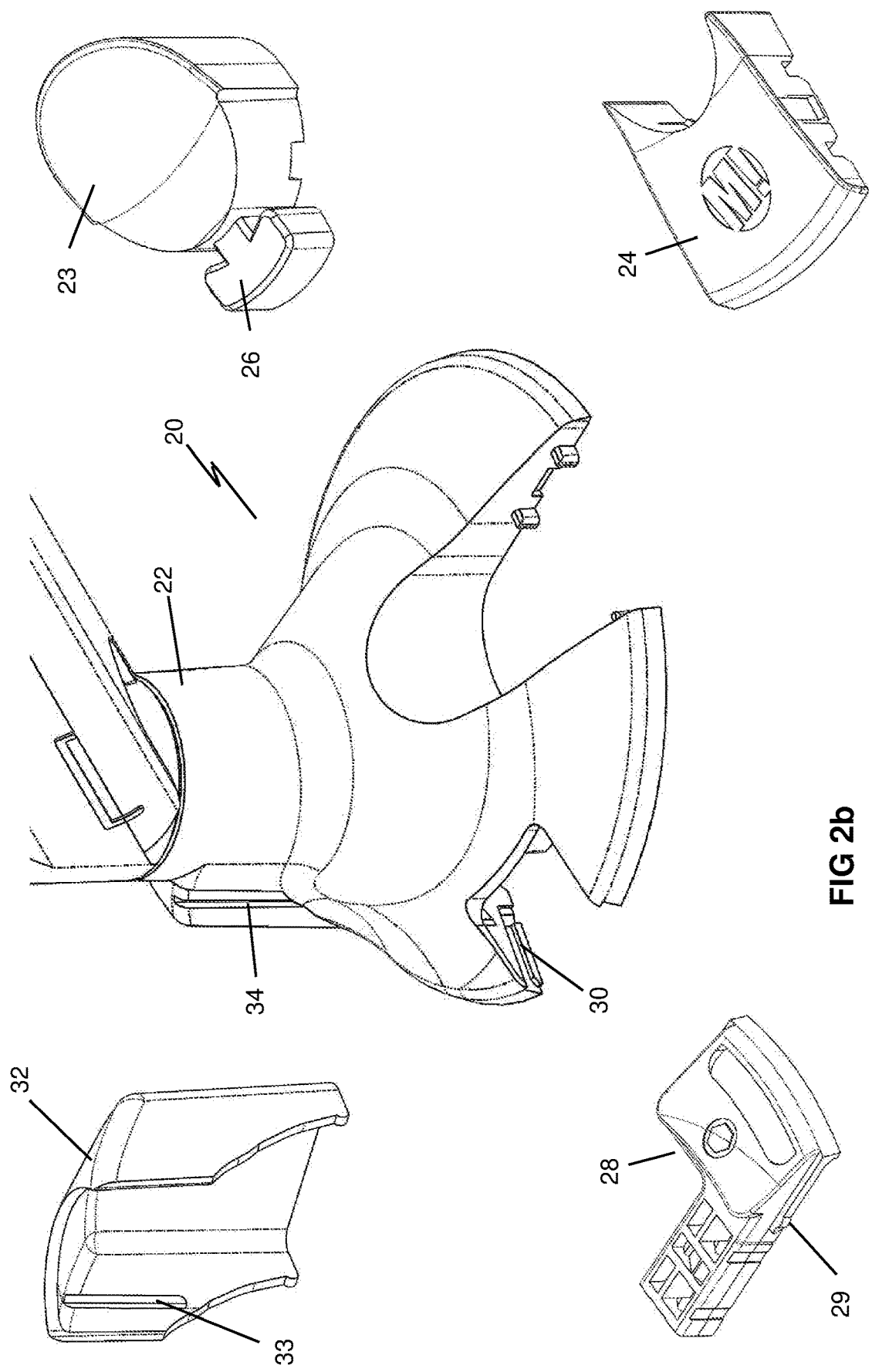
Figure 2D:
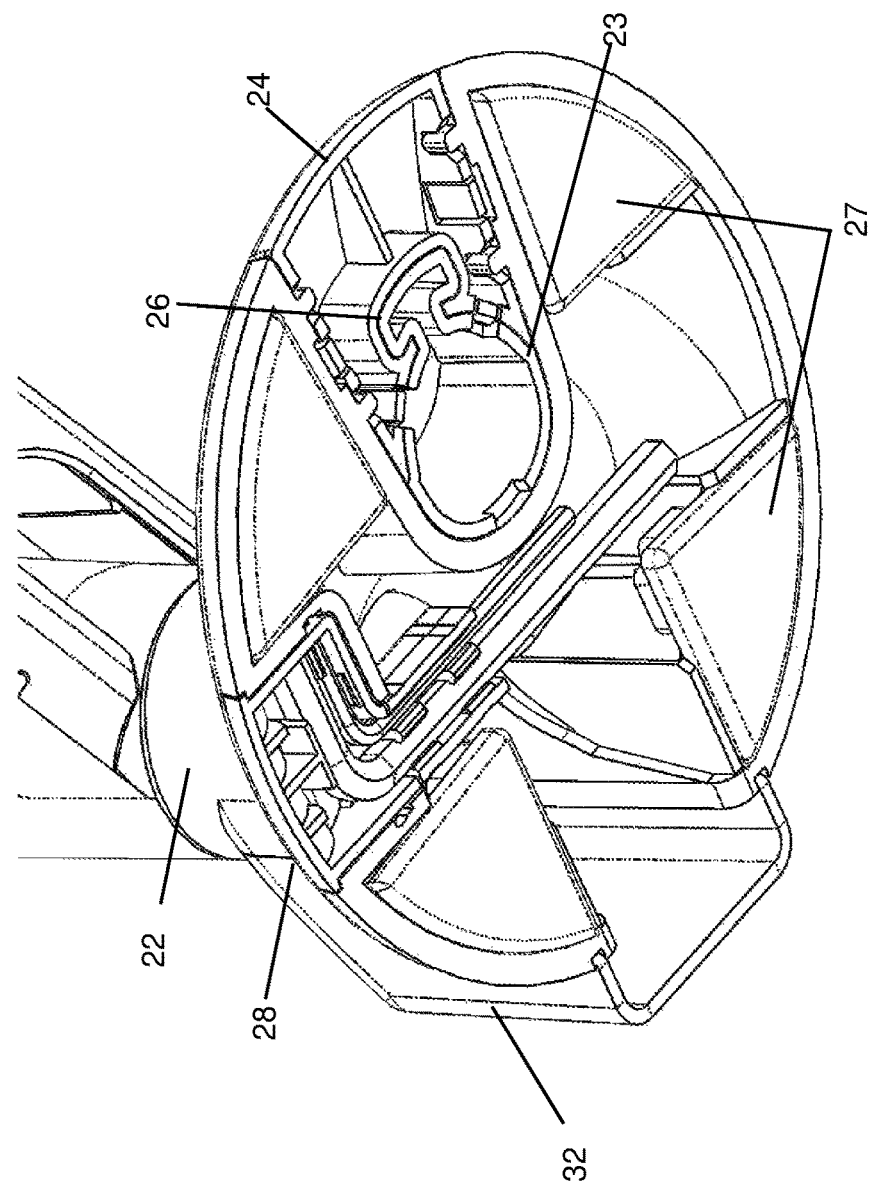
Figure 2C:
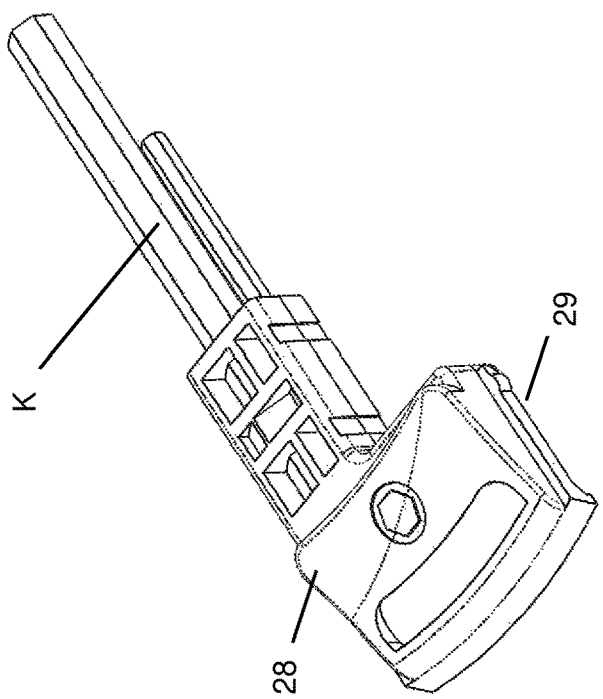
Figure 2E:
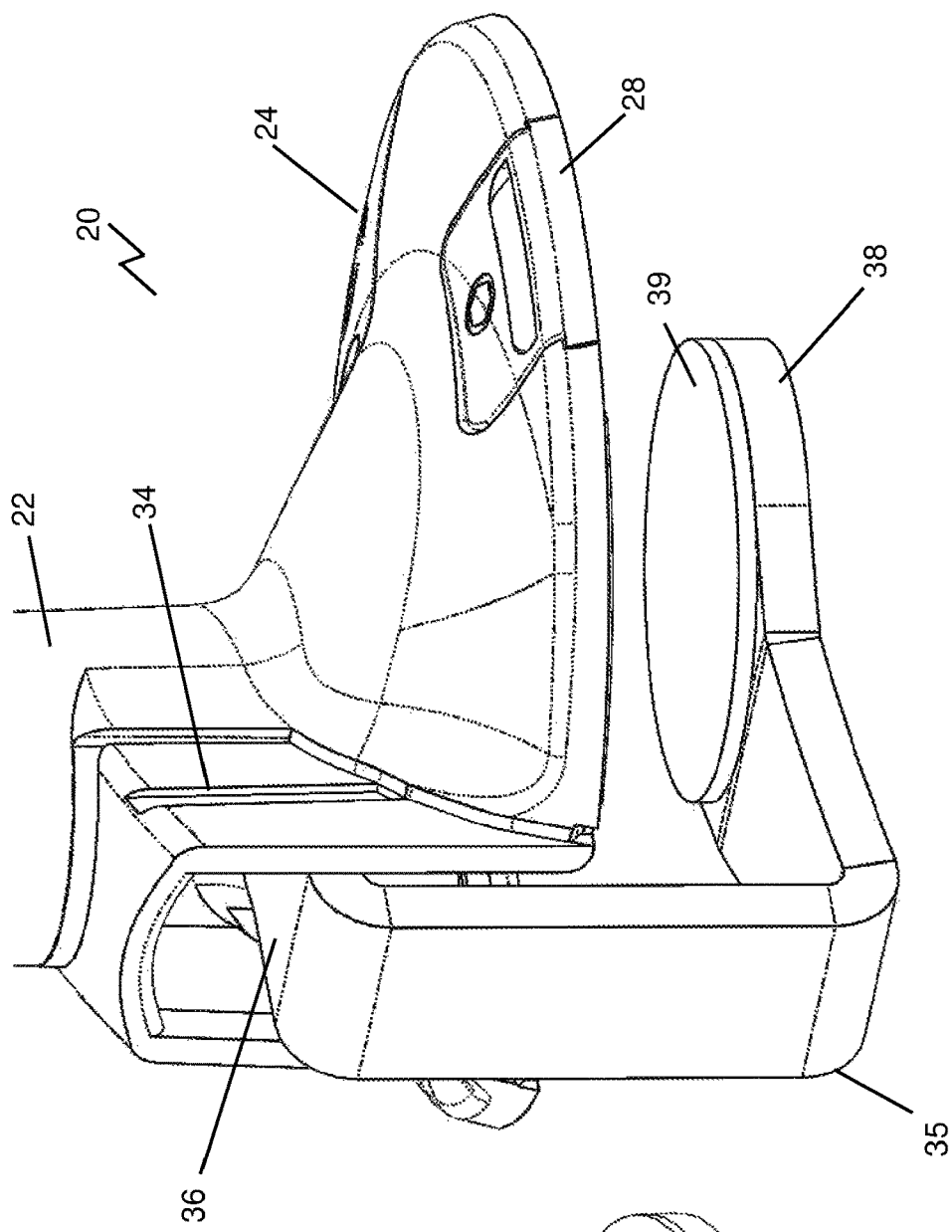
Figure 2F:
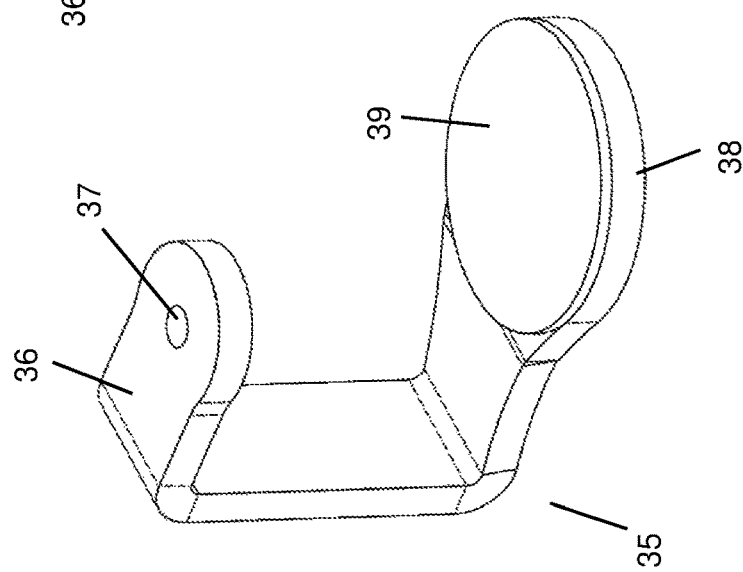

Referring to the drawings and initially to FIGS. 1a and 1b, the display device support arm 10 of the invention comprises a securing foot 20, a first support arm element 40, a coupling mechanism 60 disposed between the first arm element 40 and a second support arm element 70, and a locking display mounting head 80 adapted to receive a flat display mounting interface (FDMI), specifically a VESA mount 100 or a rail mounting arrangement 110 to which one or more VESA mounts are attached, optionally via an intermediate locking ring 120 to provide enhanced rotational control of the VESA mount or rail.

By utilising a combination of preferred features, constant friction joints, machined surfaces and anti-rocking collars within rotary joints, and intuitive adjustment mechanisms, a more functional, adaptable and aesthetically pleasing support arm is presented.

Referring now to FIGS. 2a to 2f, the preferred construction of securing foot 20 is shown. It will be appreciated by the skilled addressee that any traditional securing component may be used to pivotally secure the first arm element 40 to a stable surface and can include a simple post or like element fixed or otherwise secured to a table, desk, workstation, floor or wall without departing from the spirit of the invention.

The preferred construction is adapted to securely fix the support arm to the edge region of a desk or workstation. A modification of the securing foot 20 is adapted to engage a standard cable routing aperture in a desk or workstation (not illustrated).

The securing foot 20 comprises an upper body portion, having a support surface engaging underside and a mounting post 22 onto which the first arm element 40 is rotatably mounted. Formed for push-engagement within the upper body portion are cable routing cut-out pieces 23,24 which are selectively removable to facilitated routing of power and data cables from the underside of the support surface. The first cut-out piece has a substantially circular cross-section and includes a tab portion 26 for engaging a corresponding retaining receiver in the second cut-out piece 24. When running cable between the supported display device and source, if the cable routing aperture in a desk or workstation is to be used or if the cable routing is to be neatly directed around a stable surface edge, the two cut-out pieces are removed by snapping them from their respective engagement clips holding them within the upper body portion profile. Once the cables are in position, the second cut-out piece 24 is replaced to leave a neat cable aperture in the foot 20.

The support surface engaging underside of the foot 20 includes a plurality of grip pads 27 to enhance initial adhesion and prevent rotation of the foot when being secured or when in use.

Also formed within the upper body portion is a tool holding member 28 having edge clip engaging means 29 to retain the tool holding member within corresponding slide receivers 30 within the upper body portion 20. The tool holding member has clips on its underside to retain a pair of hex (Allen) keys K required to install and adjust the components of the arm, ensuring they are readily available and that they are not easily lost, as is so often the case. When the securing foot is in position and in general use, the tool holding member 28 may be slid out from the side when the tools are required and simply snapped back into place when they are to be stored again.

To the rear of the foot, adjacent the mounting post 22, a slide cover 32 is provided with internally disposed slide attachment means 33 for fixing the cover to the post 22 and is removably attached thereto by engaging slide receivers 34 therein. The cover 32 provides an aesthetic finish to the rear of the post which is open to accept the upper arm 36 of a clamping member 35 which has a major clamping arm 37 spaced from the upper arm 36 and is adapted to engage the underside of the stable mounting surface for the display device support arm securing foot 20.

Figure 2G:
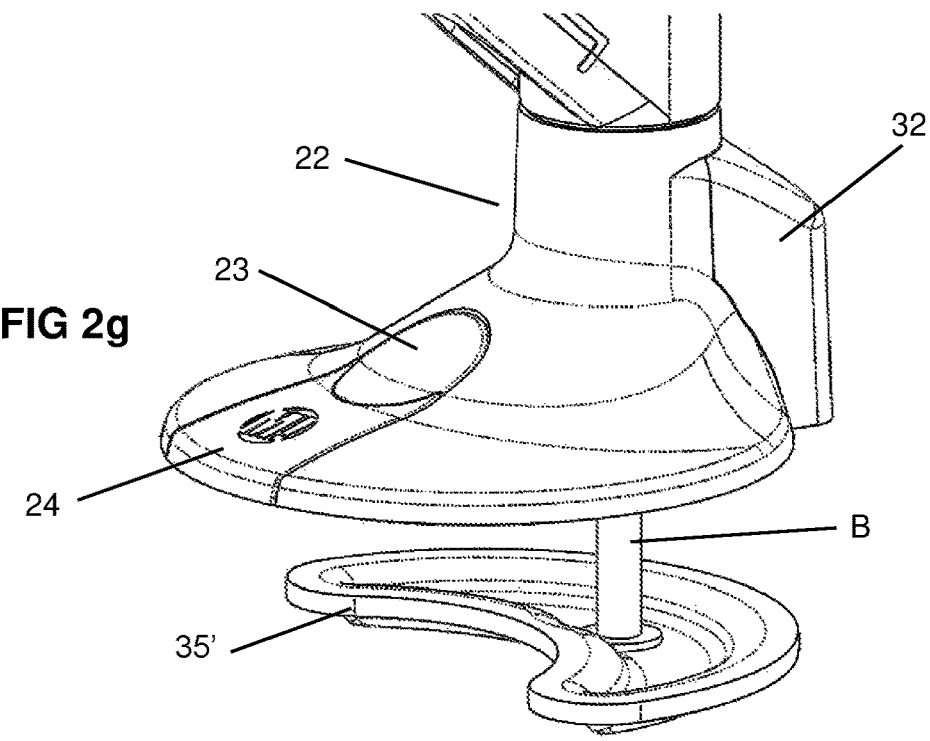
Figure 2H:
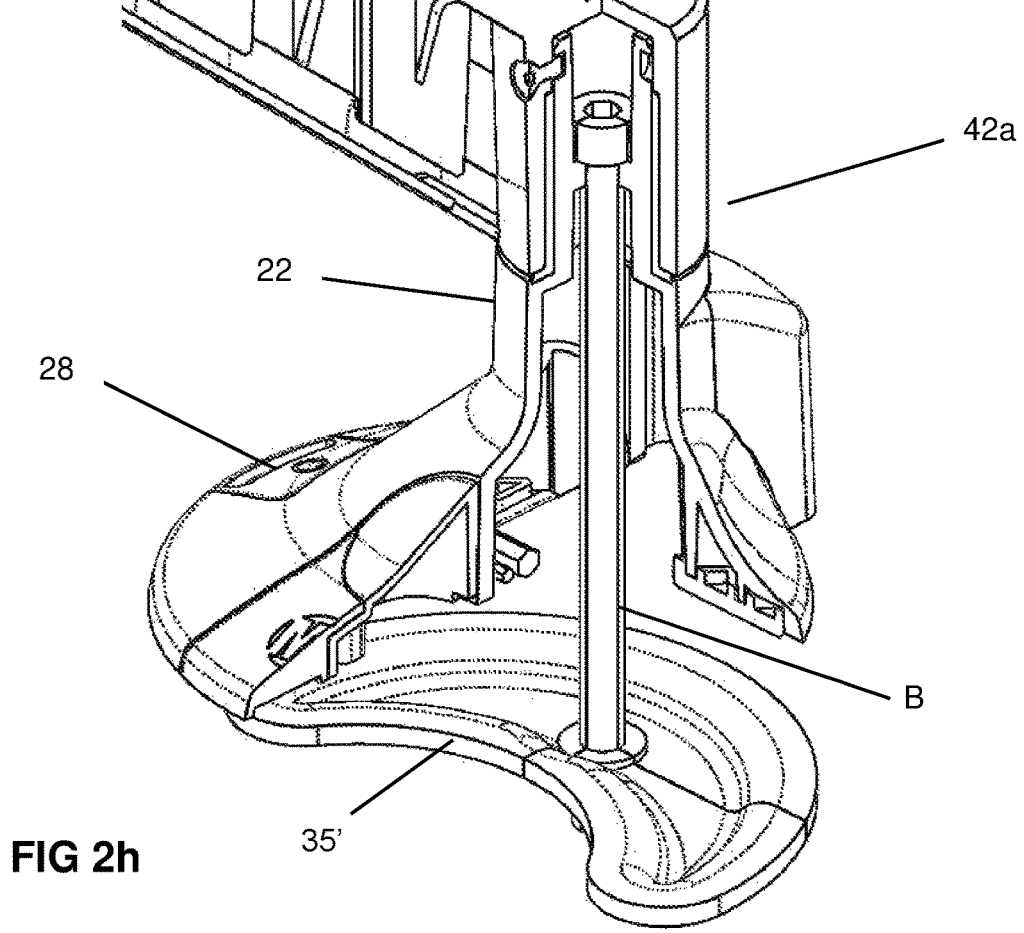

FIGS. 2g and 2h show a variant of the securing foot in which the clamping member 35' has a substantial crescent shape to allow the foot to be more readily secured through the standard cable routing aperture present in most office desks and workstations while retaining the cable routing facility therethrough.

Figure 3A:
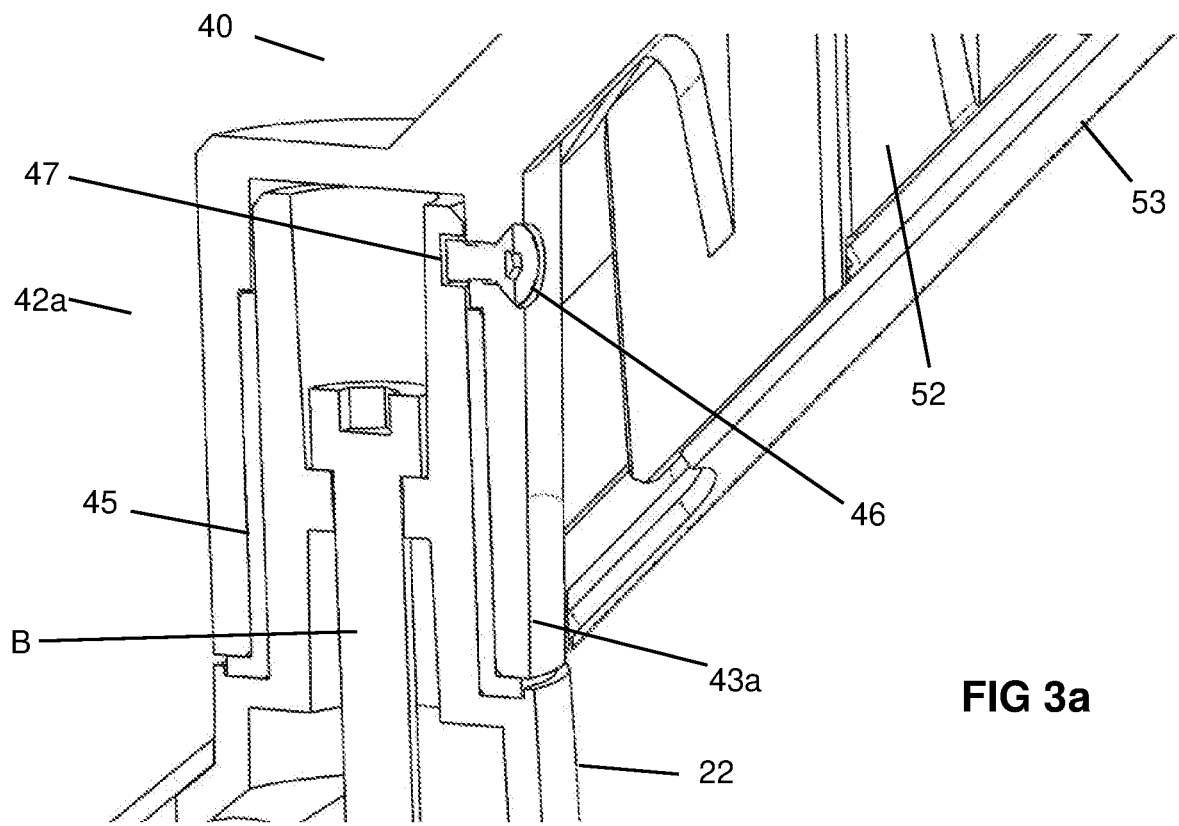
FIGS. 3a and 3b are detailed cross-sectional elevations of variants of a lower rotary joint allowing pivotal attachment of the first support arm element to the foot.
Figure 3B:
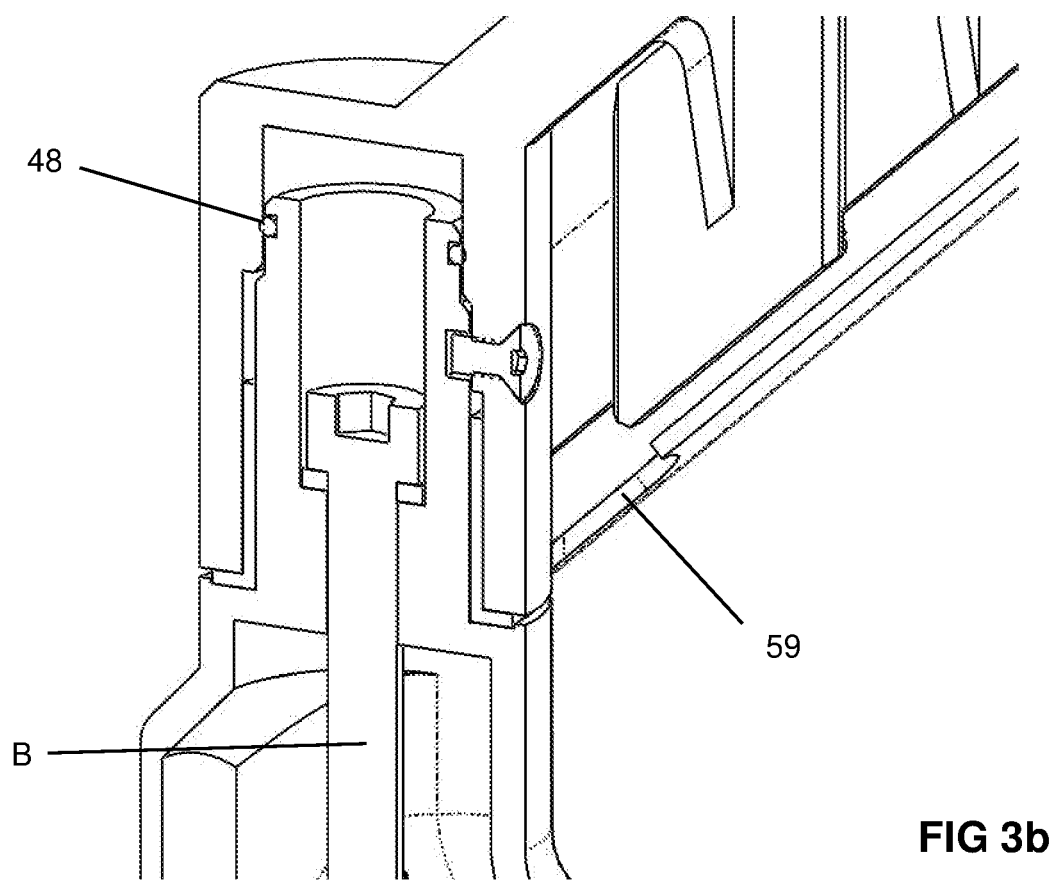

As illustrated in FIGS. 3a and 3b, the mounting post 22 includes a hollow cylindrical portion within which there is disposed a securing bolt restriction collar to retain a fixing bolt B which has a threaded end adapted to engage a correspondingly threaded hole 37 in the upper arm 36 of the clamping member 35. The clamping member is slidingly restrained within the region defined by the rear aperture in the post 22 so that when the bolt B is tightened, the clamping member 35,35' is drawn upwardly so that a surface-engaging pad 39 mounted on the lower clamping arm 38 is brought into engagement with the underside of the securing surface so that the securing surface is gripped between the lower clamp member 38 and the upper body portion of the foot 20 which also has surface gripping pads 27 on the underside thereof.

The first support arm element 40 is attached to the mounting post 22 at a lower rotary joint 42a by engaging a machined receiver 43 within the lower end of the first support arm element. A bearing collar 45 and high precision machined surfaces ensure a very tight tolerance joint with little or no rocking. A countersunk screw 46 provided in the curved wall of the receiver engages a stop channel 47 on the hollow cylindrical portion of the post 22 to limit the rotation of the arm with respect to the post. The screw 46 cannot be over-tightened to increase resistance or otherwise restrict rotation of the arm with respect to the post. The lower rotary joint 42 gives a consistent and controllable friction and this can be enhanced by the provision of an O-ring 48 positioned on the hollow portion of the post above the stop channel 47, as illustrated in the rotary joint variant of FIG. 3b. A corresponding (but inverted) upper rotary joint 42b (as shown in more detail in FIG. 5e) is disposed at the upper and of the first support arm element 40 and includes a machined receiver 43b and a bearing collar 45 to provide a high tolerance joint with little or no rocking by adjusting the bolt B to rotatably secure the coupling mechanism 60.

The first support arm element 40 includes a channel 52 within which power and data cables (not shown) may be retained and held in position by a removable cover 53. As shown in FIGS. 4a to 4c, the cover has a plurality of index tabs adapted to engage corresponding receivers 55 on the peripheral edges of the channel 52. The tab receivers 55 are spaced apart to allow the cover to be removed by sliding it upwardly in a direction parallel to the longitudinal axis of the arm element 40 by the length of one receiver. The length of one receiver is indicated for visual interpretation by a user by a profiled representation 57 of the receiver on the support arm 40 adjacent the channel 52 and by a corresponding reference mark 58 on the cover 53. The cover also defines apertures 59 at each end thereof for the passage or retaining of cables within or proximate the support arm.

Figure 5D:
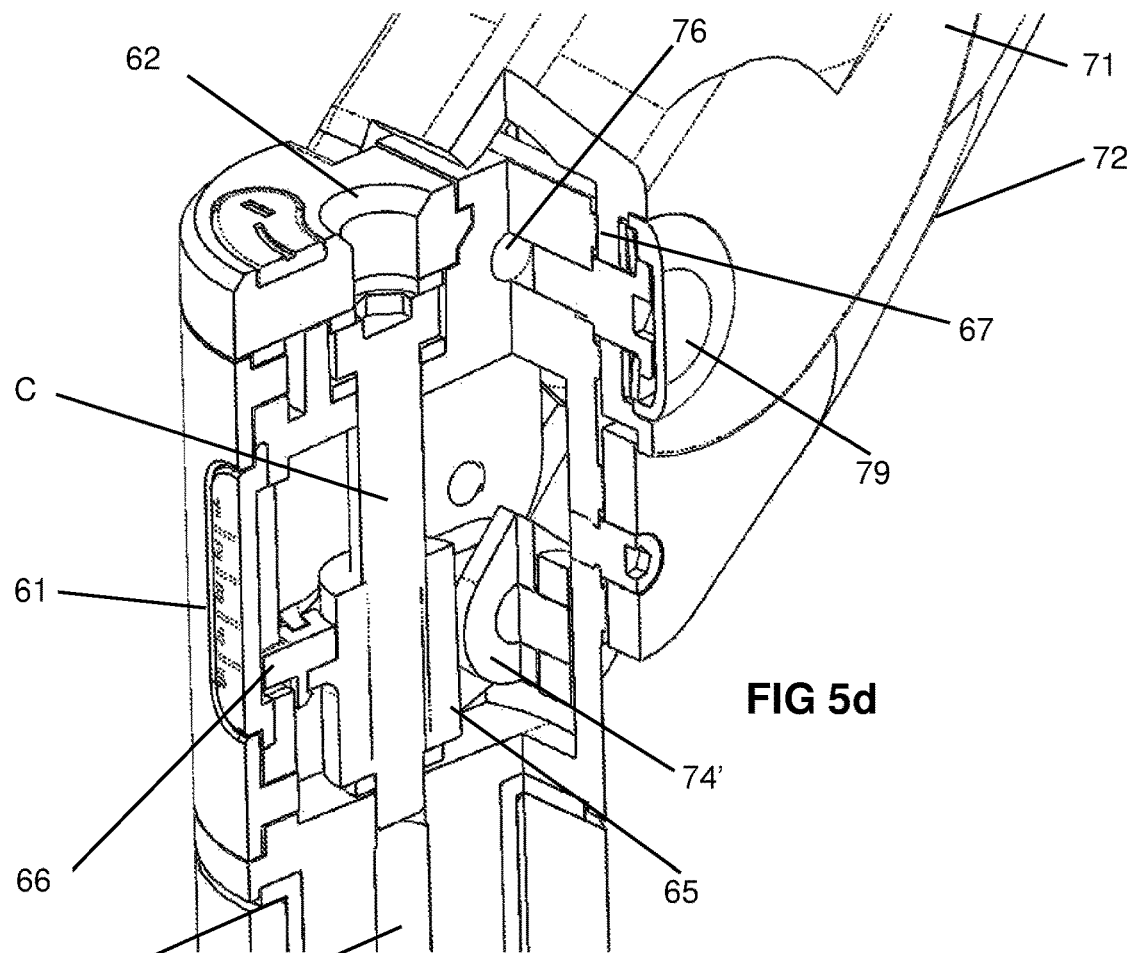

As shown in the FIG. 5a, at the upper end of the first support arm element 40, a coupling mechanism 60 for the components of the second arm element 70 is provided. As will be illustrated in more detail with respect to FIGS. 5c and 5d below, the coupling mechanism includes a window 61 for a load adjustment indicator and an aperture 62 at the upper surface of the mechanism for gaining access to an adjustment bolt C for receiving an Allen key for adjusting the load resistance in the second support arm element 70.

The second support arm element 70 comprises a pair of longitudinal components 71,72 in a parallelogram linkage arrangement, as is well known in the art, and includes therewithin a gas strut 74 which is fixed at one end to the upper component 71 along its length and at the other end 74' to a threaded collar 65 mounted for adjustment on a correspondingly threaded section of the bolt C within the coupling mechanism. The collar 65 includes an indicator 66 visible through the indicator window 61 on the side of the coupling mechanism. As the position of the collar 65 is moved by the bolt C, the position of the end 74' of the gas strut 74 with respect to the parallelogram linkage alters the static load bearing and also the resistance to movement when the display support arm is manually positioned.

At each end of the upper component 71 of the second support arm element 70, a constant friction joint is formed, securing the upper component to the body of the coupling mechanism 60 at the lower end and to the receiver body portion of the locking display mounting head 80 at the other end, using a pair of shoulder bolts 75 as the main connection fixing.

As detailed in FIGS. 5b and 5c, bearing surfaces 67 of the coupling mechanism body are formed around a threaded pivot aperture 76 for receiving the shoulder bolts 75 which hold the upper one 71 of the longitudinal components of the upper support arm element 70 to the coupling mechanism 60. The bolt 75 is machined to define a fixed distance between an inferior shoulder 75a adapted to bear against the coupling mechanism body and a second superior shoulder 75b which retains a first bearing washer 77 and a spring washer 78, of the type also known as a Belleville washer, and brings the corresponding surface of the upper arm component 71 against the bearing surface 67. When the bolt 75 is tightened up so that the inferior shoulder 75a abuts the coupling mechanism body, the spring force associated with the compression of the Belleville washer 78, acting against the superior shoulder 75b, ensures a known force is exerted on the bearing surface 67.

This force, which can be modified through the respecification of the distance between the inferior 75a and superior 75b shoulders of the bolt 75 and the compression force associated with the Belleville washer 78, is what provides a constant and predictable friction at the joint.

Furthermore, should the bearing surfaces 67 of the body of the coupling mechanism 60, the corresponding interior bearing surfaces of the upper arm component of 71 or at the locking display mounting head 80 wear, the Belleville washer 78 will take up any slack in the joint while still providing the required spring force within the constant friction joint. As the forces change only very slightly, any alteration in friction or resistance to movement will be imperceptible to the end user.

This combination of specific fixing bolts 75, bearing 77 and spring 78 washers, together with tolerance features on the bearing surfaces 67 ensure there is a designed friction applied to the joint. This provides certain advantages to the constant friction joints so that:
  the joints allow for some wear during the life of the product, with the spring washers 78 expanding to make up for any lost material;
  the shoulder bolts 75 can be bonded using a cyanoacrylate adhesive (such as Loctite (registered trademark)) into the threaded pivot apertures 76 so that the bolt 75 will not be liable to become loose during use, so that a user need not ever loosen or tighten the fixing bolts 75; and
  the friction applied by the joint can be accurately specified and is consistent and repeatable across batches.

A cover 79 is provided over the head of each shoulder bolt 75 to provide an aesthetic finish.

Figure 5E:
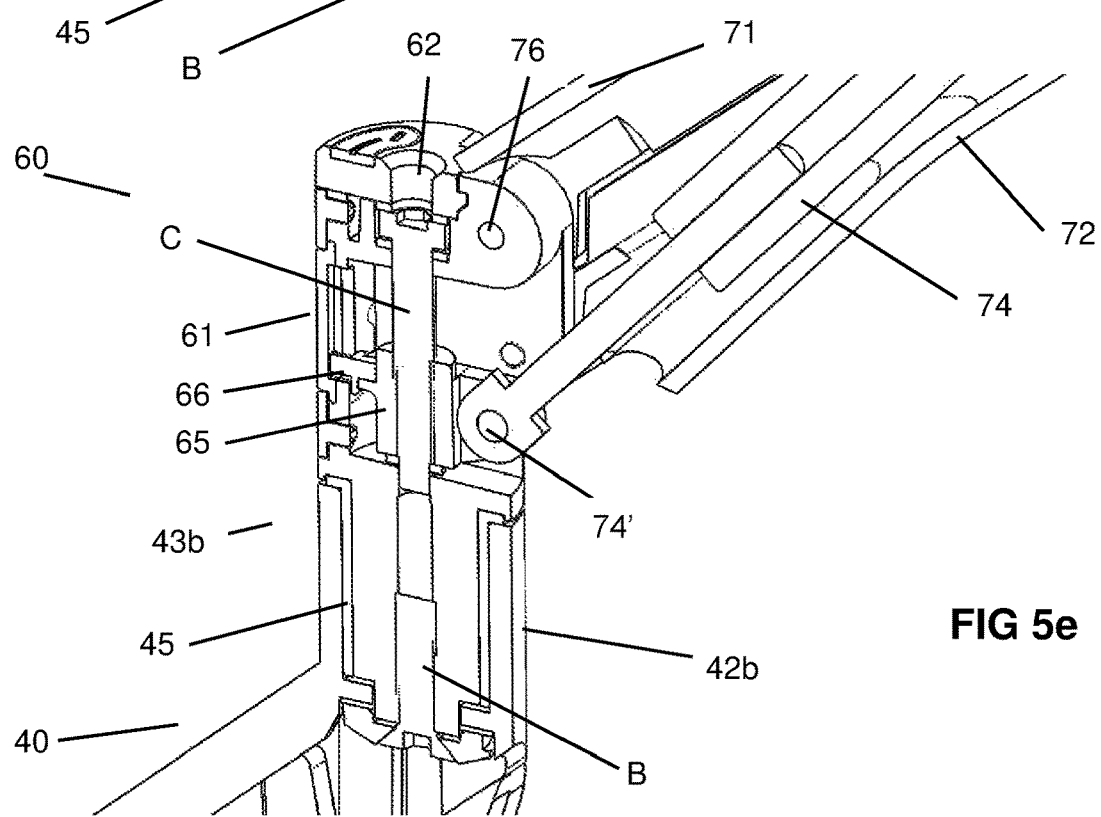
Figure 5F:
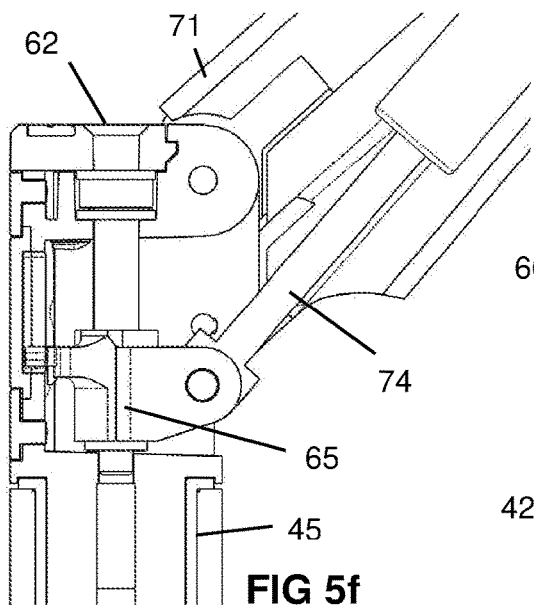
Figure 5G:
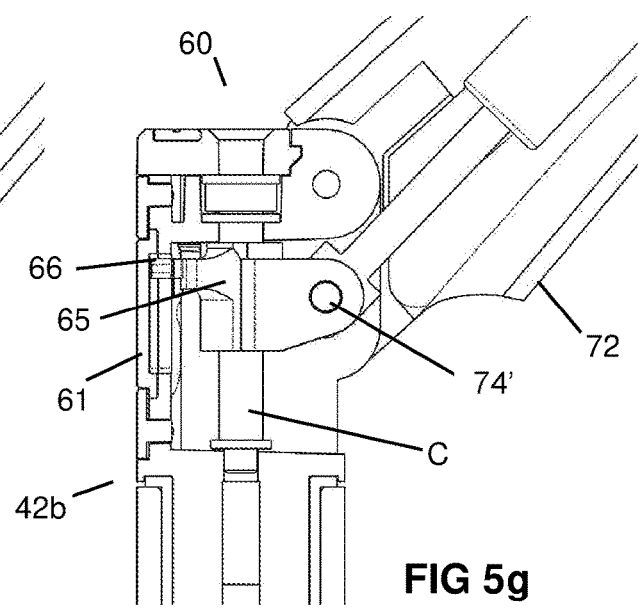
Figure 5H:
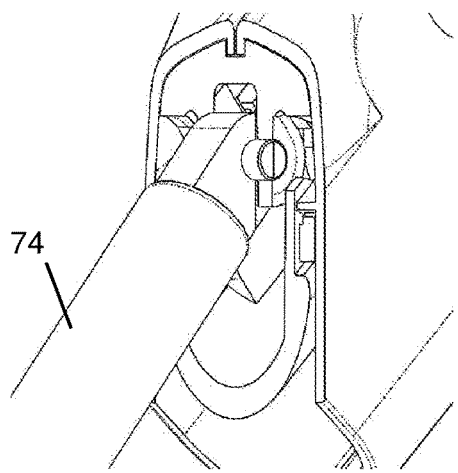
Figure 5I:
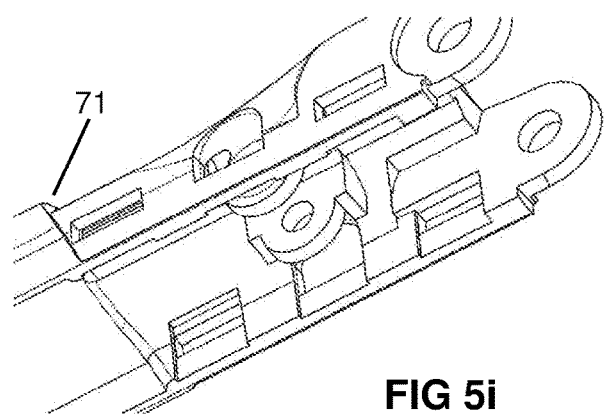
Figure 5J:
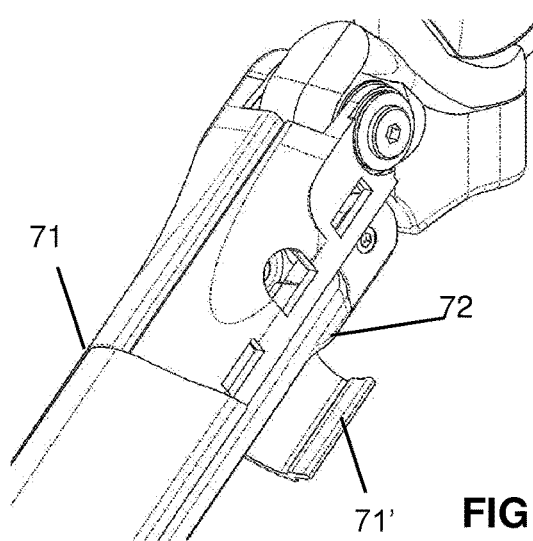
Figure 5K:
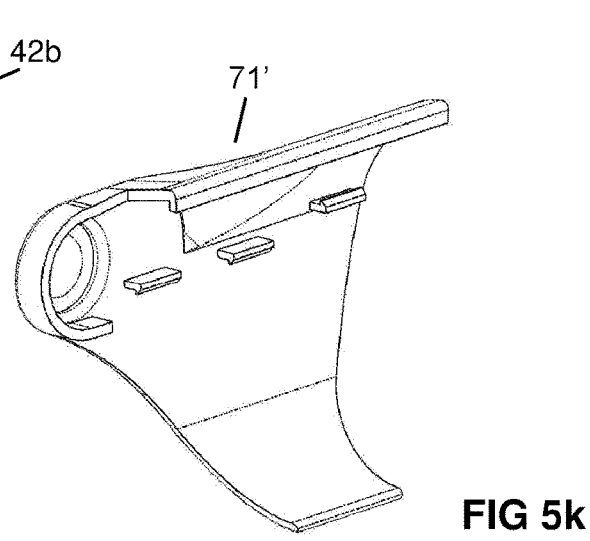
Figure 6A:
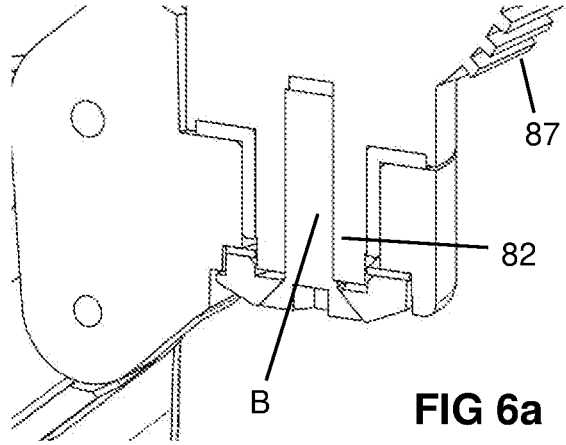
FIGS. 6a to 6f are sectional and perspective elevations of the components of the central and upper rotary joints.
Figure 6B:
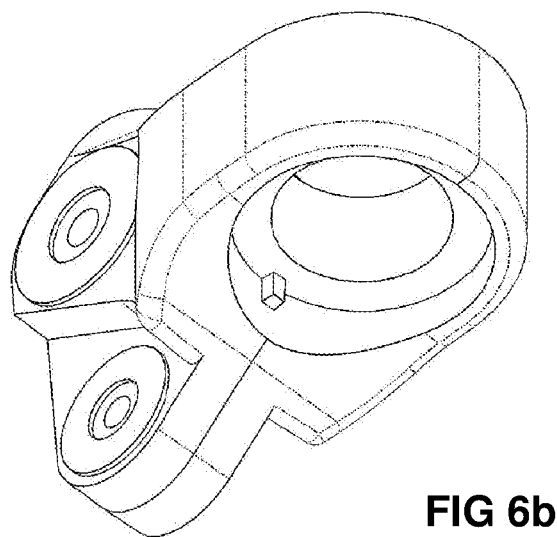
Figure 6C:
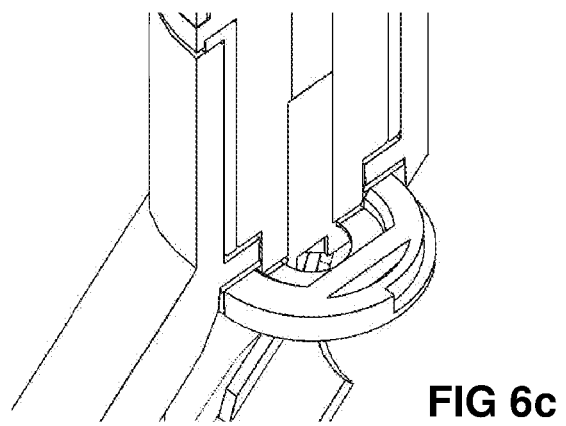
Figure 6D:
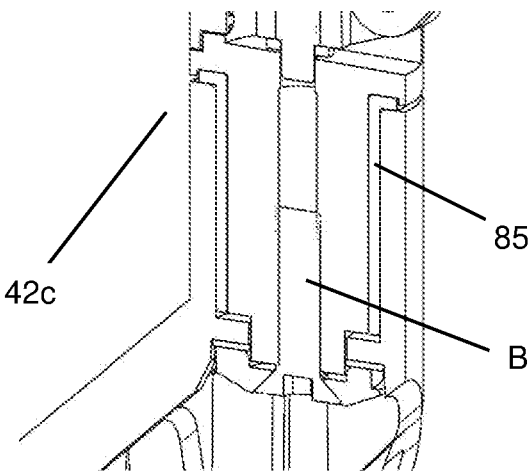
Figure 6E:
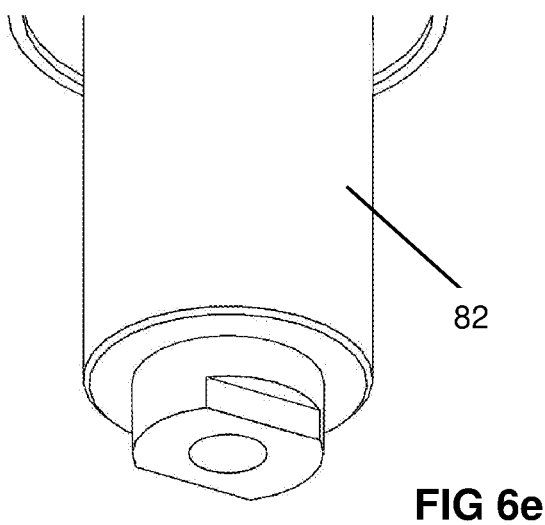
Figure 6F:
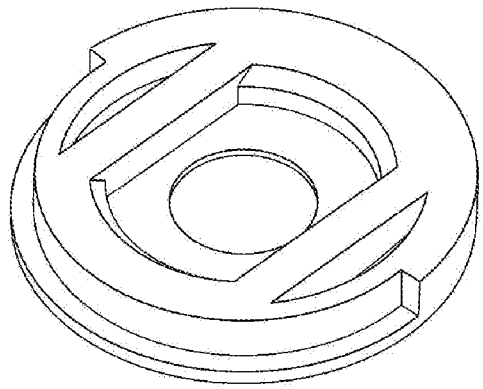
Figure 7A:
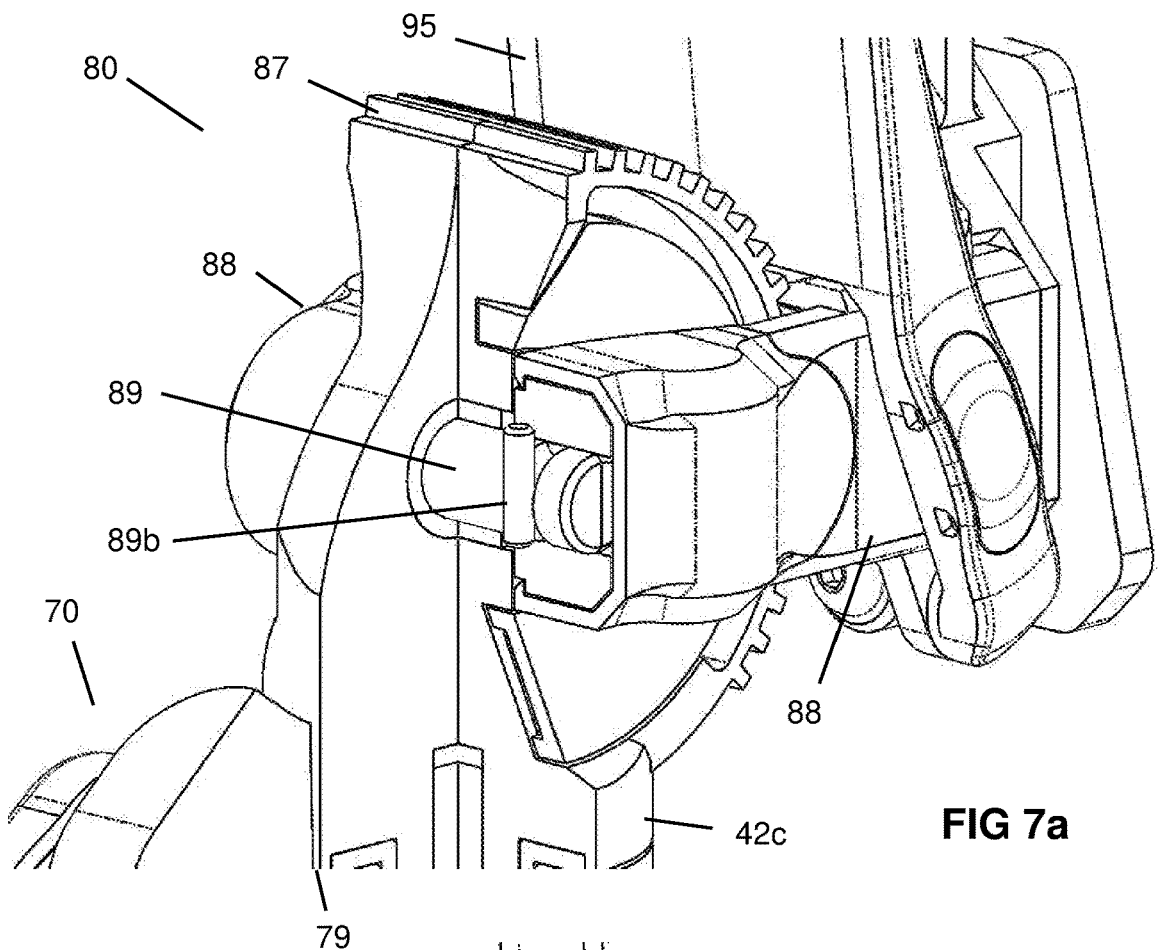
FIGS. 7a to 7e are detailed perspective elevations of a locking display mounting head with mount interface adapted to engage a flat display mounting interface (FDMI) or a rail mount adaptor to which one or more VESA mounts are attached.
Figure 7B:
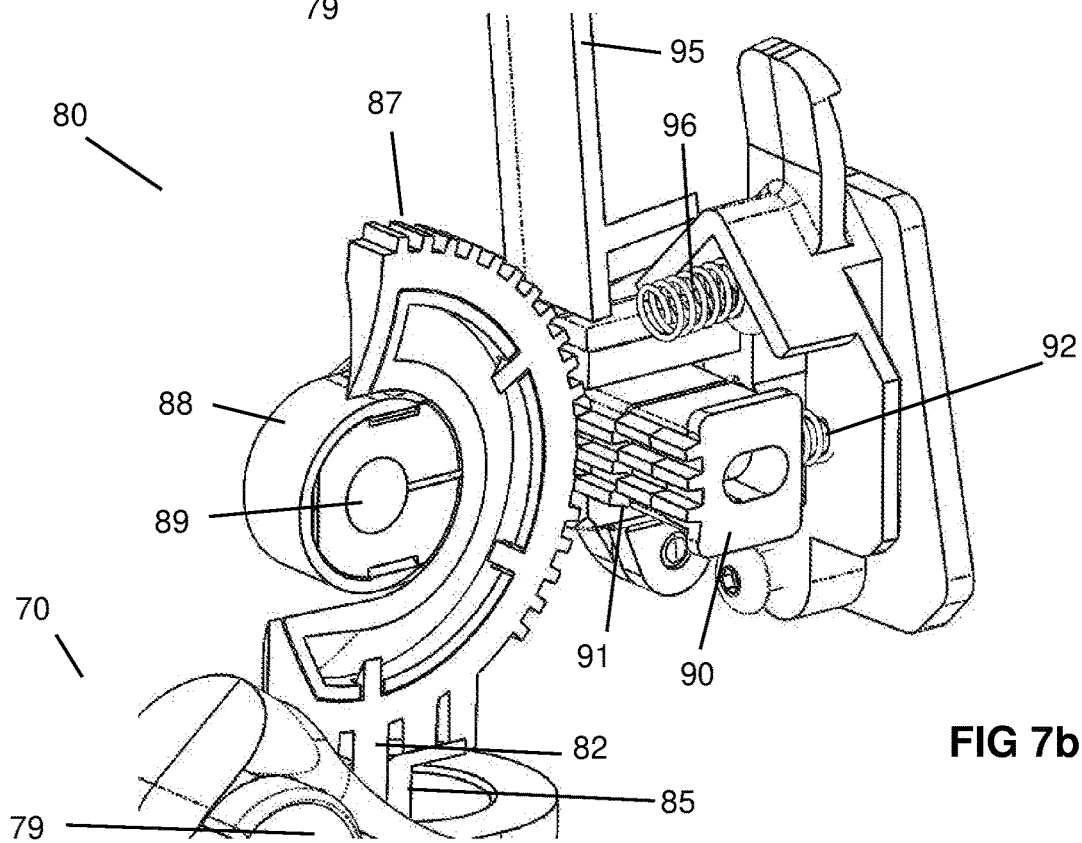
Figure 7C:
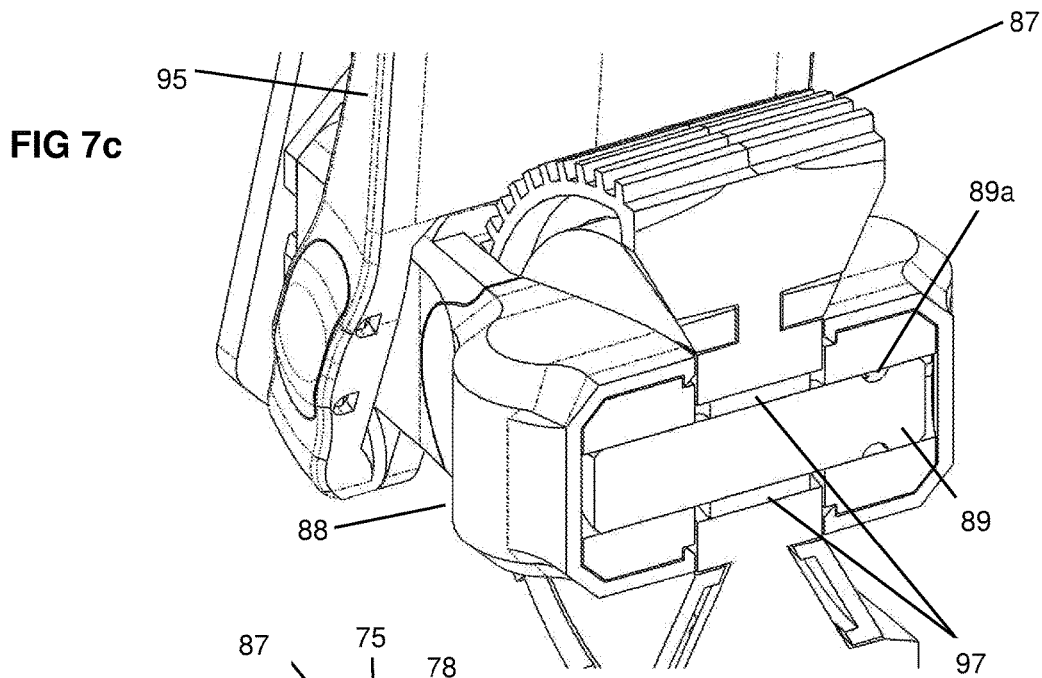
Figure 7D:
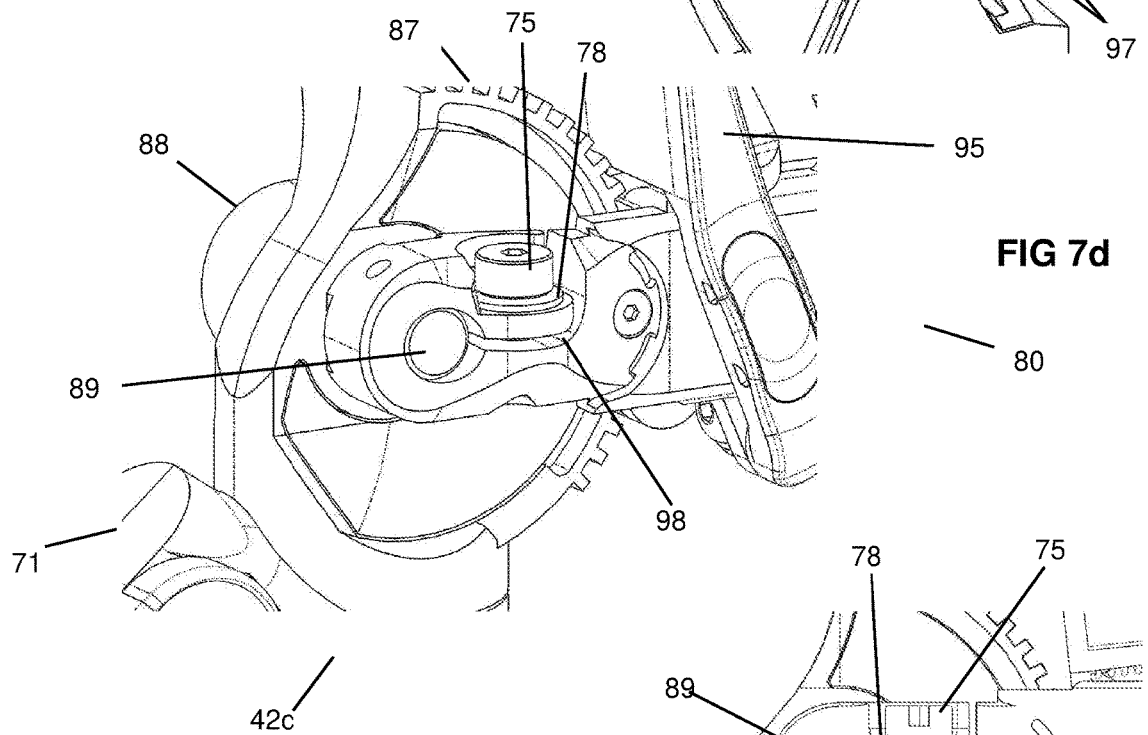
Figure 7E:
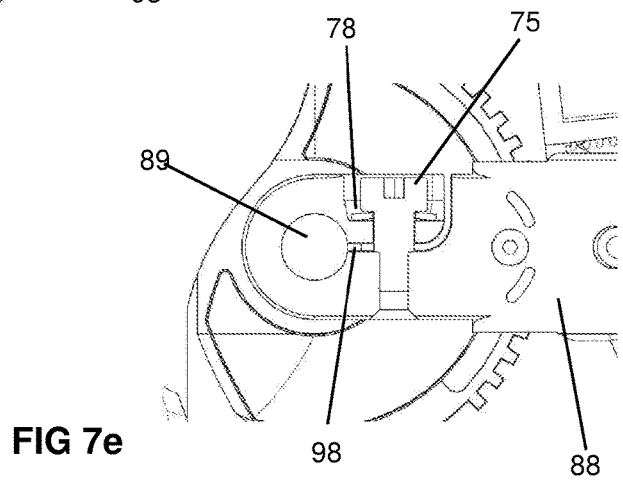

FIGS. 5d and 5e provide further details of the coupling mechanism 60 and FIGS. 5f to 5k are additional illustrations of the coupling mechanism and the parallelogram linkage with gas strut defining the second support arm element. At the upper end of the linkage the two components making up the second arm element are anchored to the body forming the receiver of the upper rotary joint 42c and a clam-shell cowl 71' is provided over the upper component of the arm element to provide protection and routing for cables to the display device and an aesthetic finish to the constant friction joint and gas strut anchor points hidden thereby.

At the upper end of the second support arm element 70, the two arm components 71,72 are rotatably fixed to a display mounting head receiver which defines the upper link of the parallelogram linkage of the second support arm element 70. As noted above, the upper arm component 71 is secured at each side by a constant friction joint, as described with reference to FIG. 5b. The display mounting head receiver also defines a rotary joint 42c into which the locking display mounting head 80 is secured in a manner consistent with the rotary joints 42a,42b described hereinabove. FIGS. 6a to 6f provide further details to the upper rotary joint which optionally incudes a control surface comprising a limited path for a stop element to prevent over-rotation of the display mount head with respect to the second support arm element 70.

Monitor arms are well-known to include a vertical tilt adjustment at the head, enabling a display device (screen) to be tilted up and down. Usually, this is done through the loosening of a fixing which frees a friction joint allowing the attached screen to pitch (tilt) downwardly under its own weight. This has several implications:
  the user must anticipate the sudden freeing of their screen and adjust their stance or position to match the weight of their screen;
  loosening and subsequent retightening of the fixing often requires a tool such as an Allen key which might not be readily available to a user;
  if incorrectly adjusted, the display device can drop over time under its own weight or the weight of multiple screens if a rail is being used;
  if incorrectly or inadequately secured, the display device can tilt if accidentally knocked or rocked; and
  display devices can be damaged if tilted or fall into the support arm or support surface and can cause damage if they impact another device or objects on the support surface or damage the surface itself.

The display mounting head 80, as shown in detail in FIGS. 7a to 7e, is secured to the second support arm element 70 via a rotary joint 42a and includes a machined post 82 with a threaded bolt and a receiver with a low friction material (PEEK) collar 85, similar to the collar 45 of the lower rotary joint 42a of FIG. 3. Fixed to the post 82 is a toothed arcuate surface 87 defining a pivot axis to which the arms 88 of the tilt mechanism are rotatably secured via a bearing-carrying pivot shaft 89.

Slidingly disposed between the arms 88 or a pair of locking blocks 90, each having a tooth surface 91 adapted to lockingly engage the corresponding toothed arcuate surface 87. The blocks 90 have an independent biasing springs 92 pushing them into engagement with the arcuate surface, each tooth surface 91 being offset to provide increased positional pitch control. The blocks are retracted from the arcuate surface by a spring trigger 95 (the spring action to be overcome being provided by the biasing springs 92 of the locking blocks 90 and a centrally disposed trigger spring 96) to allow the arms 88 to rotate with respect to the arcuate surface 87.

The main components of the locking display mounting head 80 are the core diecast aluminium body comprising the arcuate surface 87 with mounting post and the two locking blocks 90, slidingly mounted on the arms 88 and being forced under spring bias into the corresponding toothed profile of the arcuate surface 87.

When a user pulls the spring trigger 95 (drawing it towards a mounted display), the blocks 90 are pulled back against their respective compression springs 91. When released, the blocks both move back towards the arcuate surface 87 but only one will intermesh with the toothed profile while the remaining block is offset and the respective teeth abut.

The preferred embodiment incorporates two locking blocks which can be identical but one simply being inverted (thus saving on component count) so that their teeth are offset by half the mark/space ratio of the profile. As the trigger is released, the blocks will hunt into the nearest locking position for one of the two blocks. This means that the number of locking positions is doubled, in this case providing 3.375 degrees between each locking point as opposed to 6.75 degrees if one block is used.

This means that the tooth profile 91 on the blocks 90 and on the arcuate surface 87 can remain fairly coarse, giving the locking mechanism a lot of strength. To achieve a similar accuracy of movement with only one block would require either the teeth to be considerably smaller, and therefore of reduced strength, or the diameter of the arcuate surface 87 would need to be increased dramatically. This principle could be applied to an increased number of blocks to provide finer pitch adjustment of the display, however, the compromise between strength, cost, complexity and the degree of movement in the current embodiment is proven adequate for all practical purposes.

As noted above, display devices can fall under their own weight if pitch (tilt) mechanisms are released suddenly or accidentally, potentially causing injury or property damage. To solve this, a joint has been devised which applies friction only when the screen is tilted downwardly and is substantially frictionless when being tilted upwardly, reducing strain on users and providing enhanced safety and usability.

A clutch bearing 97 is provided on the pivot shaft 89 and acts to dampen the movement of the mounting head when it is lowered, thereby preventing a display or display rail assembly from crashing down when the spring trigger 97 is released. This clutch bearing 97 is press-fitted into the arcuate surface body and can be provided as an off-the-shelf component. The bearing allows rotation freely in one direction, much like a needle bearing, but mechanically locks in the other due to the rollers wedging against the pivot shaft 89. The (10 mm diameter) ends of the shaft 89 are held by the arms 88 through constant friction joints 98, of the type discussed hereinabove, comprising shoulder bolts 75 and sprung Belleville washers 78 and provides a constant friction to the tilt motion when the trigger 95 is actuated.

The pivot shaft 89 includes an annular detent 89a which in combination with a retaining pin 89b is used to prevent the pivot shaft moving axially over time.

The spring trigger released locking display mounting head offers discrete mechanical locking positions with a user-friendly method of releasing and moving the mounted display or display assembly. The system has the following benefits to the user:

- no tools required for adjustment, all pitch (tilt) control being given through the trigger and the frictional movement being controlled via constant friction joints requiring no adjustment throughout the product life;
- when the trigger is released, screen pitch (tilt) will remain secure exactly where it was left without drooping or if accidentally knocked;
- with 40 locking positions over 135 degrees (°) range of movement (3.375° between each position), users have better perceived control over the exact position of the display screen when compared to existing mechanisms;
- screen adjustments are smooth and require minimal effort;
- movement can be limited to 90° upwardly and 40° downwardly to offer full function for most all applications while restricting or mitigating movements which may damage the display;
- an easy-action trigger accessed by reaching over the screen releases the head locking mechanism; and
- friction is applied only to the downward tilt, which ensures that it is easy to tilt the screen up but it cannot fall freely under its own weight if dropped or released by accident.

Figure 8A:
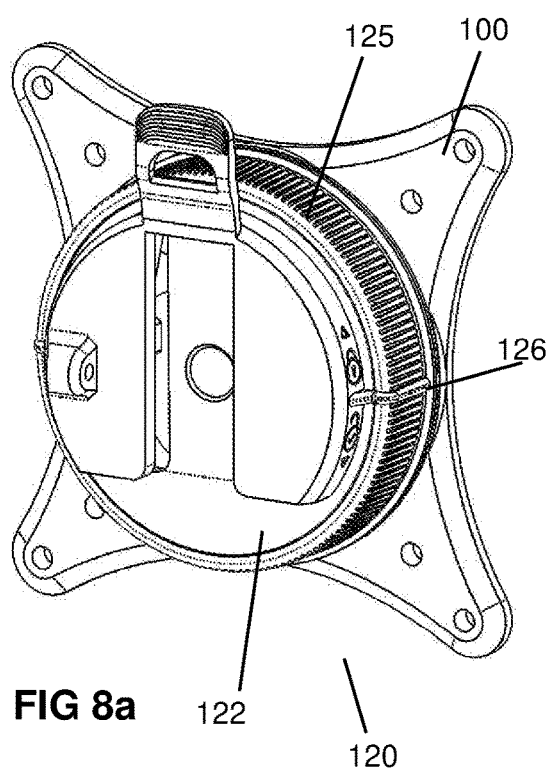
FIGS. 8a to 8c are detailed elevations of a flat display mounting interface (FDMI), referred to hereinafter as a VESA mount, including a receiver for attaching to the mounting head interface of FIGS. 7a to 7e and having a rotational lock movable between a locked position and an open position to facilitate rotation of the VESA mount.
Figure 8B:
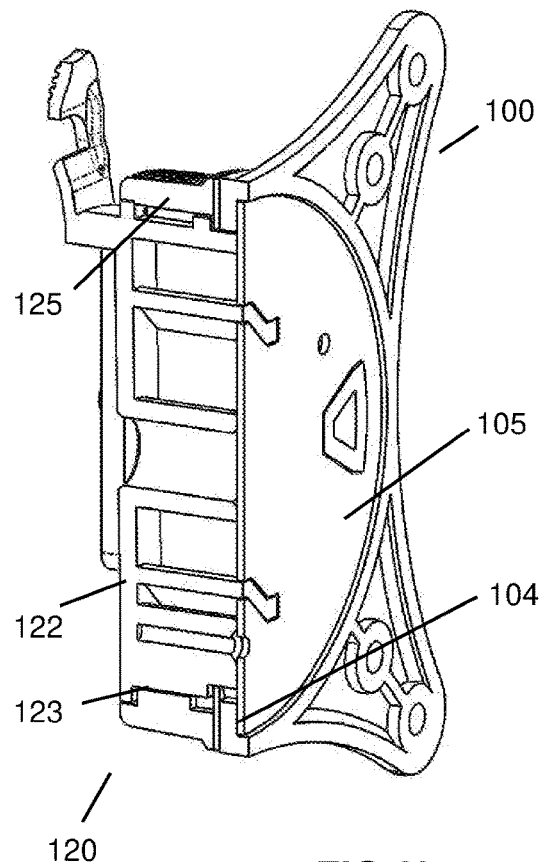
Figure 8C:
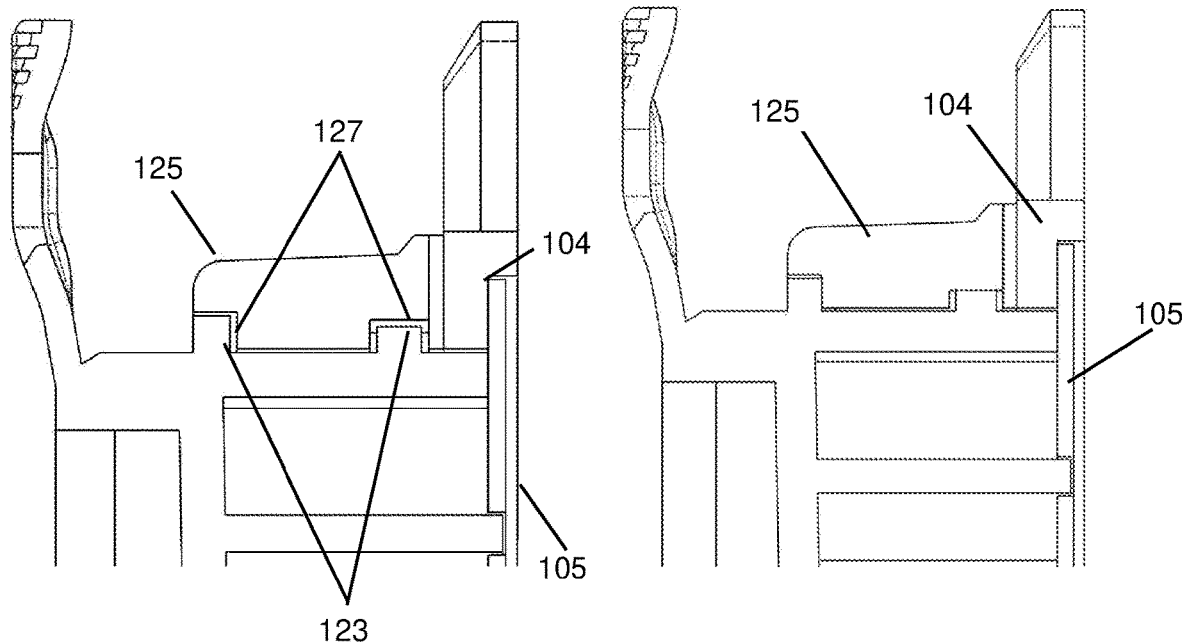
Figure 10A:
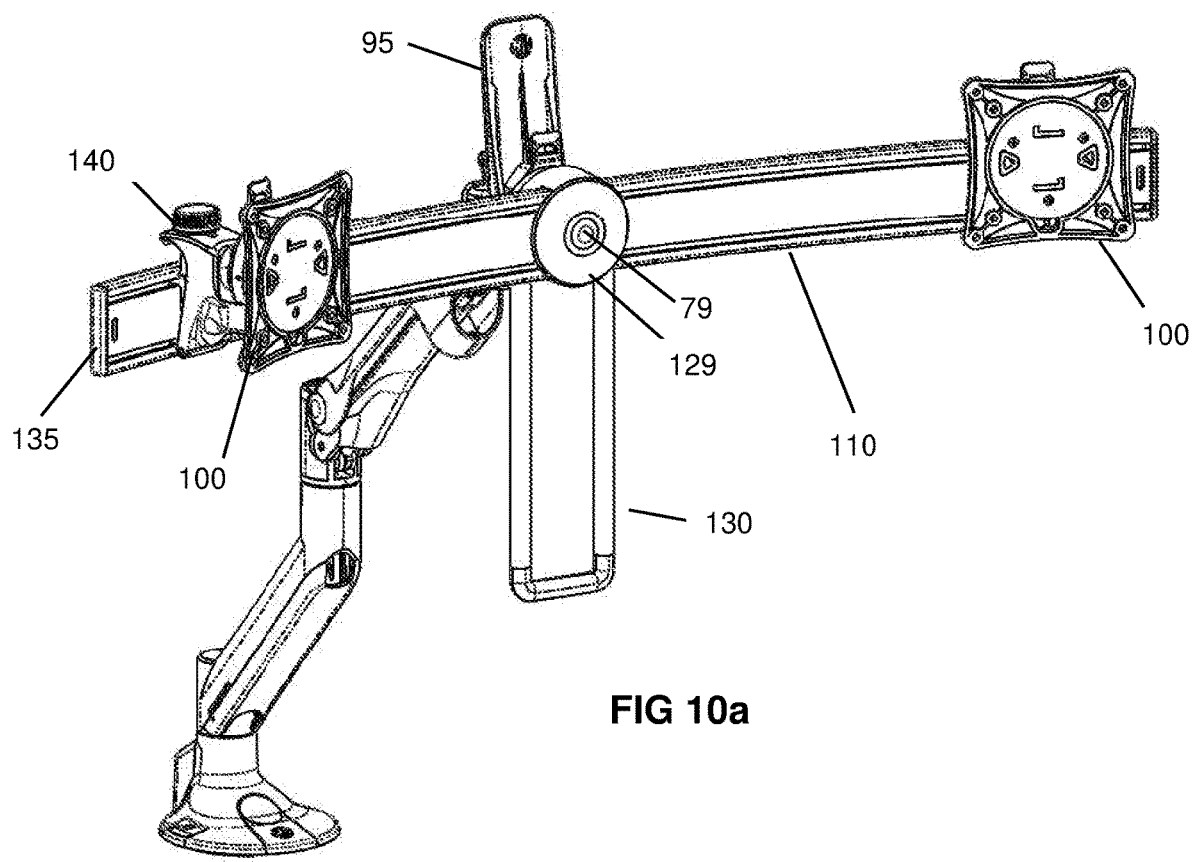
FIGS. 10a to 10e are detailed views of a rail assembly including a mounting head adaptor having a mounting head interface receiver therein to engage with the spring released tilt mechanism of the support arm, the rail assembly carrying at least two brackets adapted to provide tilt and rotational movement to respective VESA mounts provided thereon and in which the spring trigger can be used to facilitate identical tilt movement of the rail to which said at least two VESA mounts are attached.
Figure 10B:
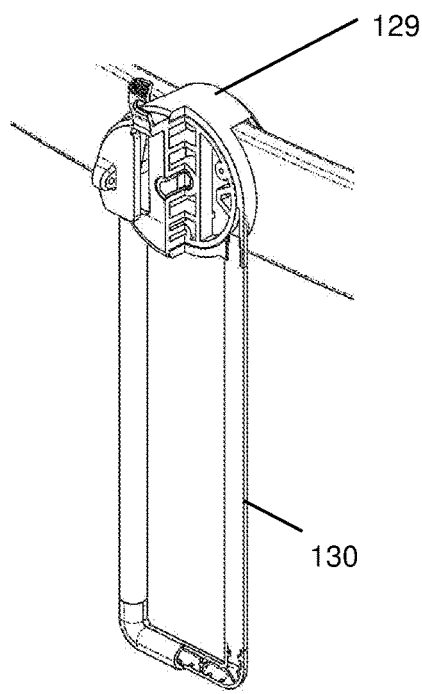
Figure 10C:
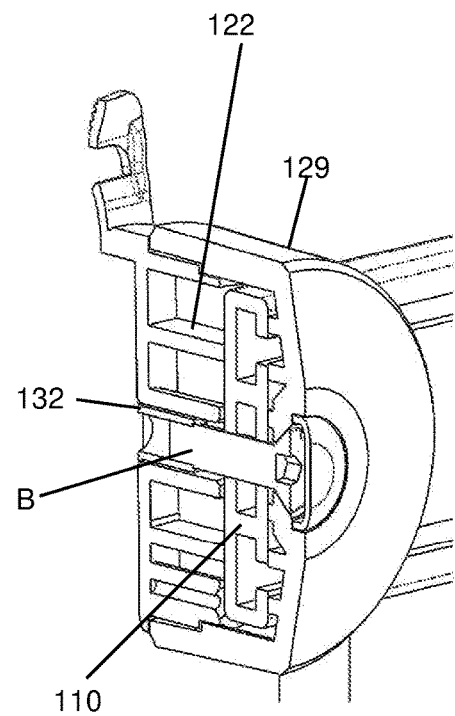
Figure 10D:
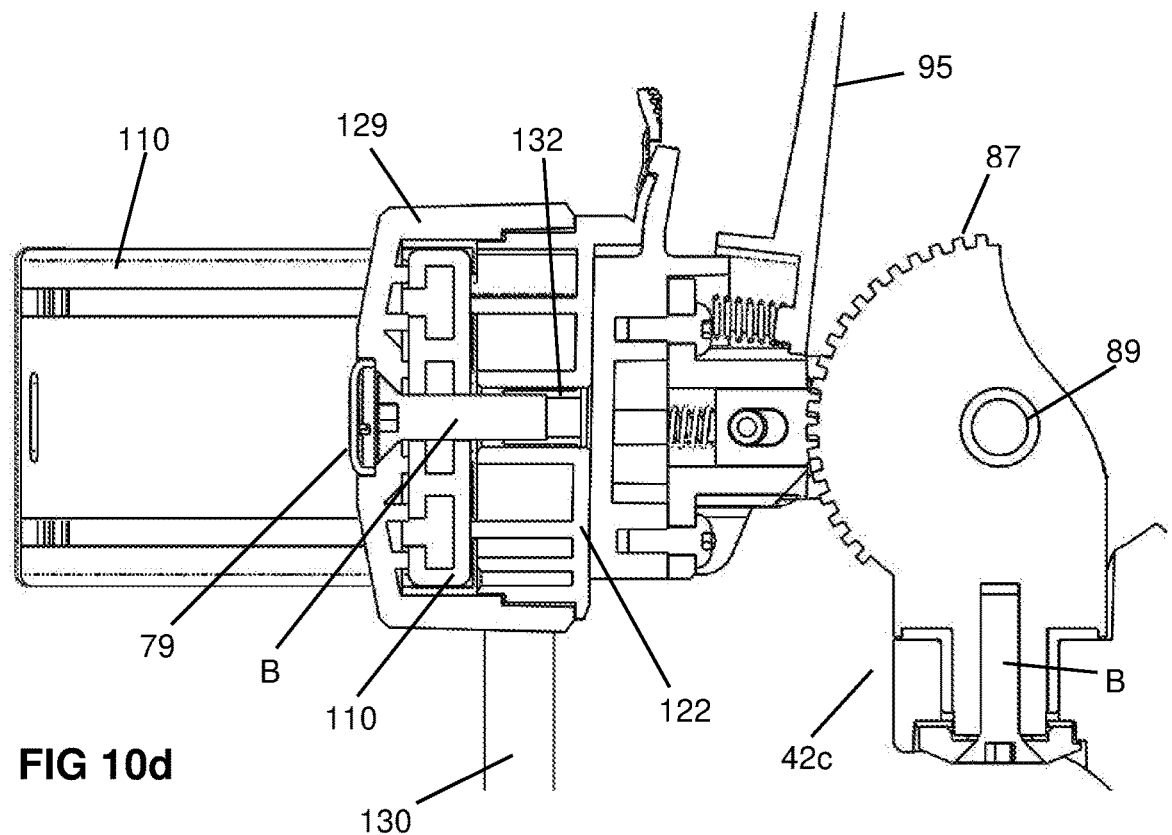
Figure 10E:
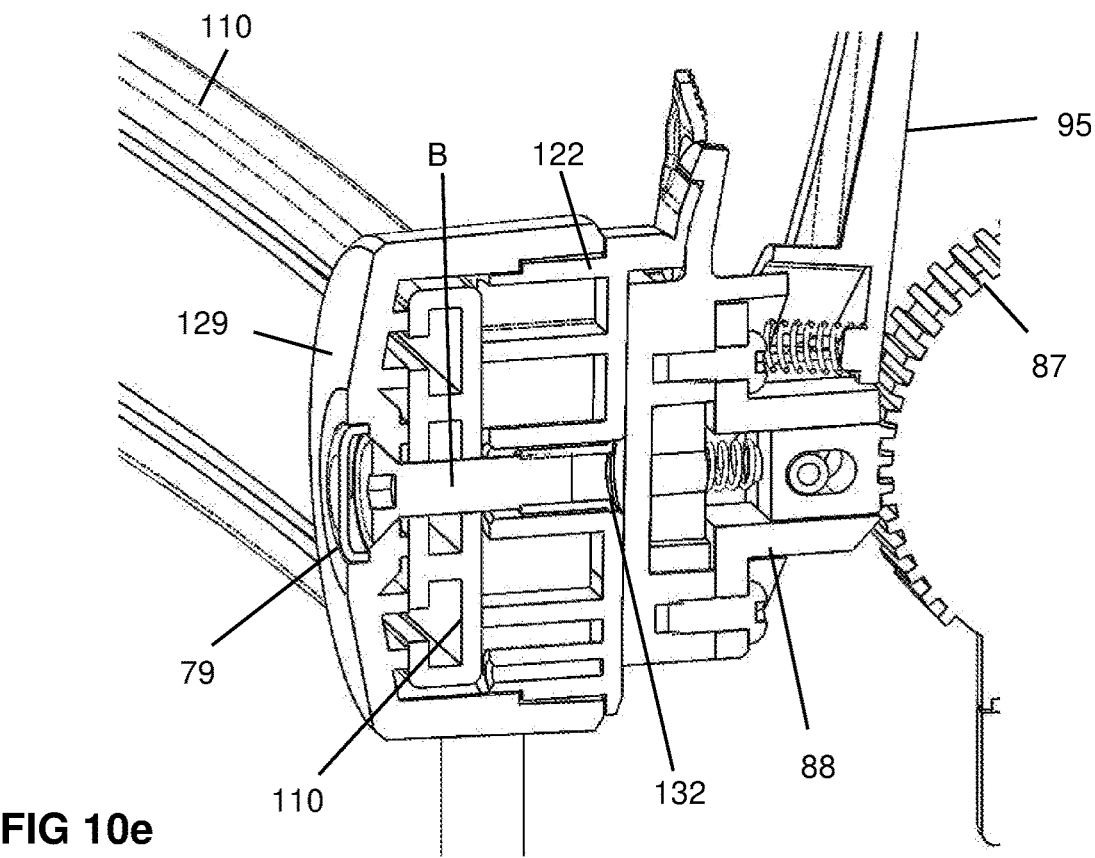
Figure 11:
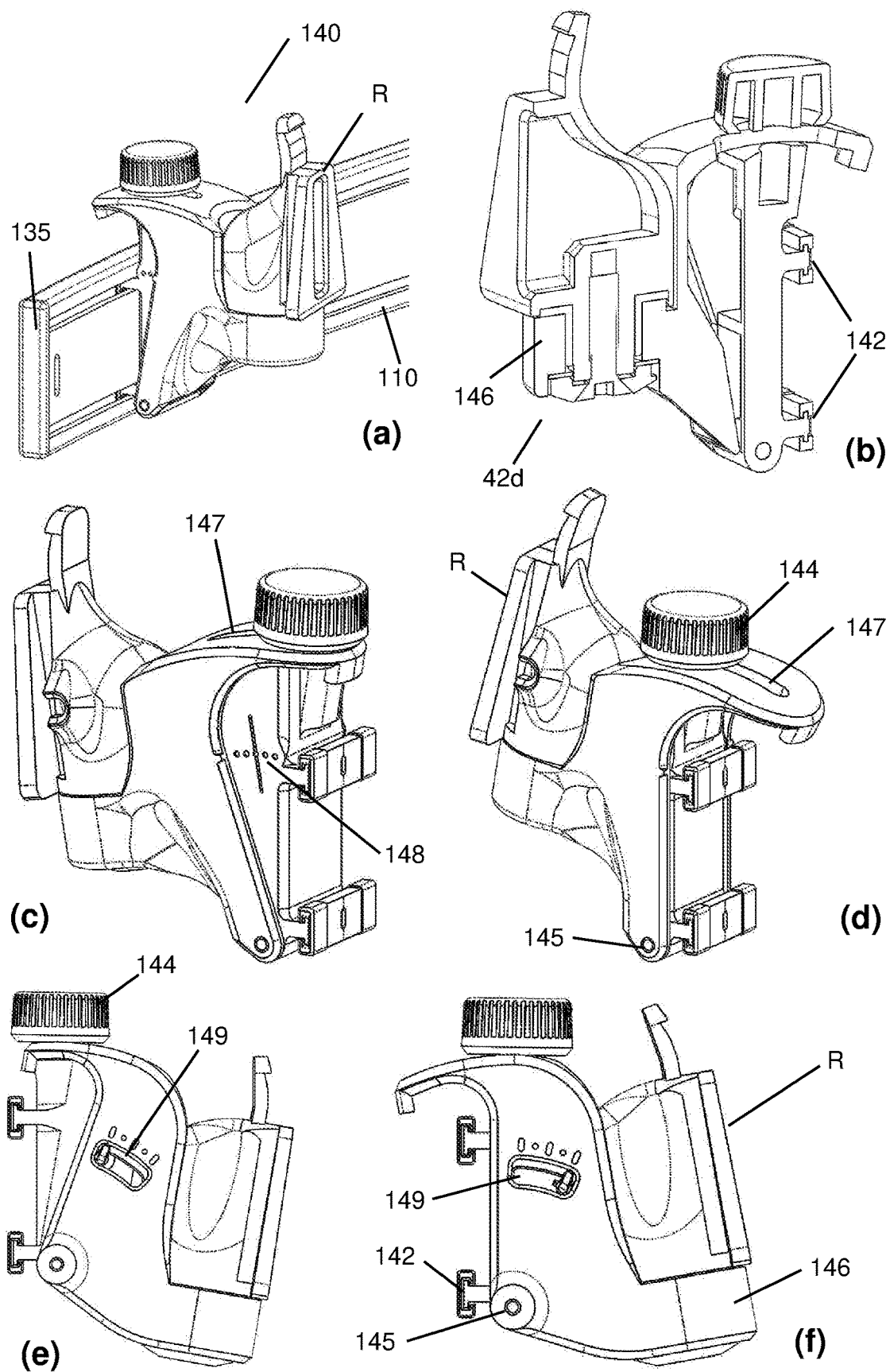
FIGS. 11a to 11f are elevations of two variants of a rail assembly bracket, each having a mount interface adapted for engagement with a VESA mount and providing tilt movement with respect to the rail to which they attach and include rotary joints to allow limited lateral movement of the display devices to be mounted thereon.

Referring now to FIGS. 8a to 8c, it is a requirement that one of the degrees of freedom of movement is the rotation is of the display screen, allowing the screen to be rotated from landscape to portrait orientation (and any angle therebetween). Although this is a necessary point of adjustment to ensure that the monitor is parallel to the desk, it can often be too easy to accidentally move and, in existing competitor devices is difficult to lock. When a lock is available, and it is not available in all products, it requires tools such as an Allen key.

Accordingly, between the display mounting head mount interface and the VESA mount 100, a display rotation lock 120 is provided which comprises an interface receiver on a stator body 122 which has bearing surfaces 123 on the annulus thereof. A VESA mount 100 is held to the stator body 122 by a metal retaining plate 105 engaging an annular mount ring 104 on the VESA mount which is adapted to rotate with respect to the stator body. Rotation is prevented by the action of an annular locking ring 125 having internal bearing surfaces 127 acting against the stator bearing surfaces 123. The locking ring 125 is provided with a push tab 126 to rotate the ring from a locked position, where cams on the internal periphery thereof engage a corresponding bearing surfaces of the display rotation lock, to an unlocked position where the VESA mount 100 is allowed to rotate.

When the locking ring 125 is rotated to its locked position, it wedges the rotational friction bearings in the locking head 120 together and, through friction, prevents the bearing surfaces moving relative to one another. This prevents the rotation of the VESA mount and therefore the monitor without tools and with minimal effort.

The display rotation head 120 locks by rotating the locking ring 125 anticlockwise. The mating faces on the interior surfaces are angled such that it creates a wedge-like interface. Before turning, the ring allows free clearance between the bearing surfaces of the rotating head and the parts are able to rotate around each other freely. When the locking ring is rotated, the clearance spaces between the bearing surfaces 123,127 are taken up and the ring pushes against the stator bearing surfaces 123, locking them together through friction.

The amount of friction on the surfaces 123 increases as the locking ring 125 tightens against the bearing surface of the locking ring 125, squeezing the VESA mount ring 104 between it and the sheet metal retaining plate 105. Small pips (not shown) feature around the diameter of the locking ring 125 to provide positive and discrete locations for full lock and looser friction points.

A variant of the display rotation lock is illustrated in FIGS. 9a to 9c and is constructed substantially similarly to the rotation lock of FIGS. 8a to 8c. In this variant, the locking ring is integrated into the mount ring of the VESA mount and is tightened with respect to the stator body 122 by an over-lever cam mechanism which, when in the locked position, frictionally engages the VESA mount ring to the stator body.

Thus, a locking ring that controls the rotational movement of the rotational head and wedges the relative moving components together to effectively lock the parts together facilitates the following advantages:
  no adjustment tools are required;
  allows users to apply various amounts of friction to the rotation to have it either loose, locked or somewhere in between;
  it requires minimal activation to move from loose to locked, making it quick and easy to adjust; and
  it has infinite adjustment, whereby it does not have to lock into discrete positions, so that the monitor can be rotated a fraction to account for a minor movement.

Referring now to FIGS. 10a to 10e, a support arm of the invention carries a rail assembly 110 on which two VESA mounts 100 are provided. A rail mount adaptor includes a mount interface receiver within a stator body 122 to secure the rail assembly 110 to the locking display mounting head 80. A handle 130 is fixed to the rail mount adaptor to allow the support arm and rail assembly to be manoeuvred easily. Ideally, display device mounting brackets 140 are provided on the rail assembly to provide the required securing with lateral movement and pitch control. Optionally, each VESA mount may be provided with their own respective display rotation locks 120 to give enhanced rotational control and security.

Traditionally, rail installations are of complex and costly construction and increase greatly the overall component count. A skilled installer is often required to remove the provided single head mount and replace it with a rail. The single head then becomes superfluous and is either disposed of or must be stored for subsequent reuse.

By utilising common components from the single locking head, the VESA mount can be removed and reused. The rail assembly can be kept simple and installation is reduced to removal of the existing VESA mount and simply attaching the rail assembly in its place. Internally, a single bolt B fixes the rail assembly adaptor to the rail and a bolt cover 79 may be provided over the bolt head. A housing 129 provides an aesthetic finish to the rail mount adaptor and a handle 130 may be used to enhance control of the rail assembly. Within the adaptor, a threaded insert 132 to which the bolt B engages is fixed within the stator body 122.

The rail 110 is a bent section of extruded aluminium and has upper and lower tracks onto which the VESA mount brackets 140 can be fixed before end caps 135 are snapped into position.

Thus, the rail assembly comprises only six core components and a single fixing.

Figure 12:
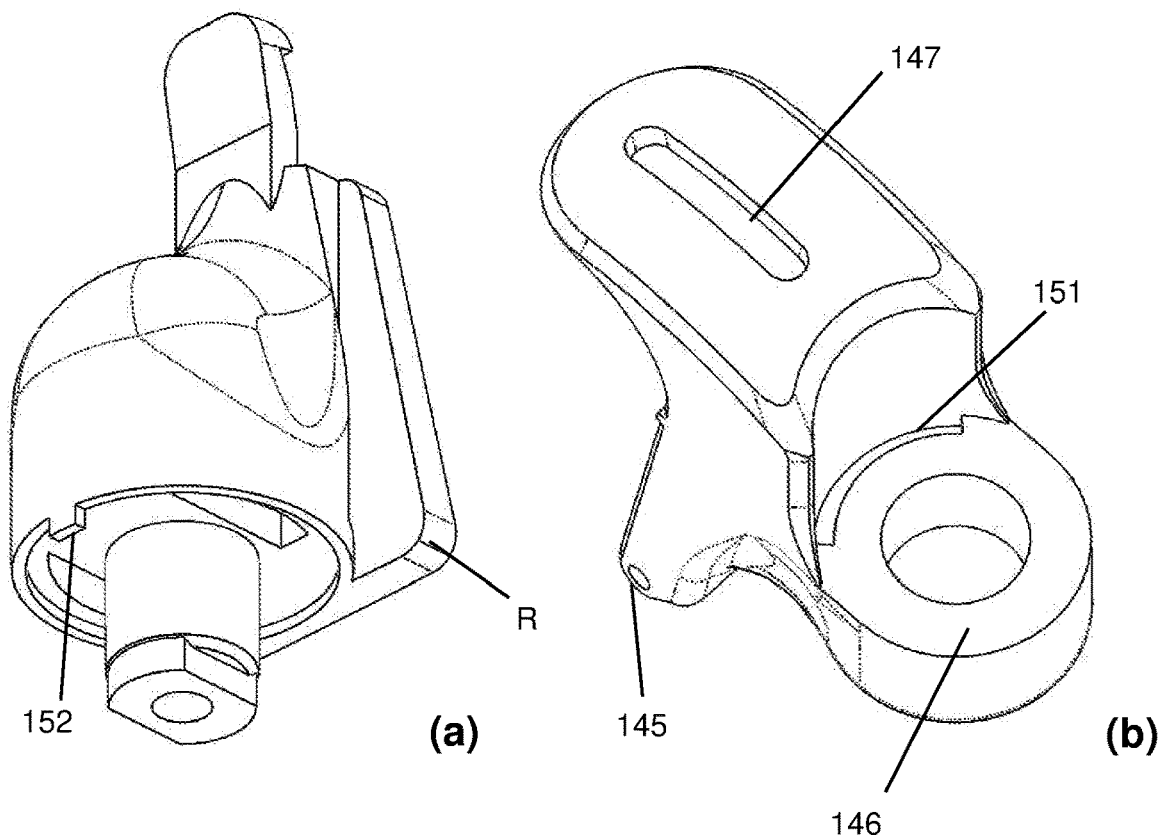
FIGS. 12a to 12c are detailed elevations of the components of the bracket including the rotary joint.

Finally, with respect to FIGS. 11a to 11f and to FIGS. 12a to 12c, a display device mounting bracket 140 is adapted to engage a support rail 110 of a rail assembly and provide tilt control to a display device mounted thereon via a VESA mount of the type having a mount interface receiver R. The bracket comprises three main parts, the first part having slot engagement profiles 142, which secure the bracket to the upper and lower tracks of the rail and a locking nut 144 to engage and release a second part which is rotatably attached to the first part around a pivot point 145 adjacent the lower one of the slot engagement profiles.

The third part includes a rotary joint 42d operably secured to a receiver 146 in the second part and a mount interface for engaging a VESA mount.

The second part has a control slot 147 on the upper surface thereof for engaging a bolt associated with the locking nut 144 to limit the upper and lower extent of pitch of the mounted display device. Tilt angle indicators 148 are provided on one wall of the first part of the bracket or via a window 149 formed in a corresponding wall of the second part to provide a ready tilt reference to an installer or end user.

As noted above, the second and third parts of the bracket together form a rotary joint 42d of substantially the same characteristics as described hereinabove and include a control surface 151 and stop 152 to limit the lateral rotation of the mount interface to prevent a display device impacting the rail assembly.

It will of course be understood that the invention is not limited to the specific details described herein, which are given by way of example only, and that various modifications and alterations are possible within the scope of the appended claims.

The invention claimed is:

1. A display device support arm of the type comprising:
  a securing component adapted to secure the arm to a stable surface;
  a first support arm element attached to the securing component at the lower end and coupling to an attachment means at the other end thereof; and
  a second support arm element having a coupling mechanism at a lower end for securing the second arm element to the attachment means associated with the first arm element and at the other end thereof having an attachment head; and
  a display mounting head, the mounting head having a first part, rotatably secured to the attachment head of the second support arm element, and a second part pivotally moveable with respect to the first part and operably coupled to a display device or mount interface thereof,
  in which the display mounting head defines a toothed arcuate surface on said first part against which correspondingly toothed blocks on said second part are brought into and out of engagement via a user actuated trigger release to controllably alter the pitch (tilt) of the second part of the head and any intermediate mount interface or display device mount interface and/or display device mounted thereon.

2. A display device support arm as claimed in claim 1, in which the securing component is selected from a post, a wall bracket, a table or workstation clamp; a wheeled caddie or a ground-engaging plate and in which the first support arm element is pivotally attached to the securing component.

3. A display device support arm as claimed in claim 1, in which the display mounting head comprises:
- on said first part, a pivot stud to engage a corresponding receiver in the attachment head of the second support arm element;
- the toothed arcuate surface to which there is pivotally mounted a spring trigger adaptor of said trigger release to move one or more of said toothed locking blocks, on said second part, out of biased engagement with the arcuate surface; and
- attached to said second part, a display rotation lock operably coupled to a display device or mount interface.

4. A display device support arm as claimed in claim 3, in which the display mounting head includes said display device mount interface adapted to engage a receiver formed within a rotational lock whereby when disengaged the lock facilitates rotation of the display device mount interface and any display device mounted thereon.

5. A display device support arm as claimed in claim 3, in which the display rotation lock additionally comprises an annular clamp having an over-lever actuated locking mechanism which in a locked position provides an inwardly directed radial force which acts on a peripheral surface of the display rotation lock and in an unlocked position allows the display device mount interface to rotate.

6. A display device support arm as claimed in claim 3, in which the pivot stud includes a control surface to prevent over-rotation of the tilt mechanism with respect to the corresponding receiver of the second support arm element.

7. A display device support arm as claimed in claim 1, in which a display device mount interface operably couples to a mount adaptor for a rail on which two or more display device mount interfaces are provided.

8. A display device support arm as claimed in claim 1, in which the first support arm element includes a channel within which power and data cables are retained and held in position by a removable cover having a plurality of index tabs adapted to engage corresponding receivers on the peripheral edges of the channel.

9. A display device support arm as claimed in claim 8, in which the tab receivers are spaced apart to allow the cover to be removed by sliding it upwardly in a direction parallel to the longitudinal axis of the arm the length of one receiver, the distance being indicated for the user by visual representation on the lower edge of said first support arm element adjacent the channel and a corresponding reference mark on the cover.

10. A display device support arm as claimed in claim 1, in which the securing component for attaching the display device support arm onto a stable support surface, including a desk, workstation, wall or floor, the securing component comprising an upper body having a support surface engaging underside and
- a cylindrical tubular stud adapted to provide pivotal engagement with a correspondingly shaped receiver disposed at the lower end of a first support arm element and having an axially disposed aperture for receiving a fixing bolt having a threaded end length adapted to engage a clamp member which is drawn towards the underside of the upper body to fix the securing component to the stable surface.

11. A display device support arm as claimed in claim 10, in which the underside of the upper body is provided with a plurality of surface engaging pads to aid grip thereto and in which an anti-slip surface is provided on the clamp member in the region where it engages the stable surface.

12. A display device support arm as claimed in claim 1, in which the securing component includes a tool holder slidingly engaged within the body thereof.

13. A display device support arm as claimed in claim 1, in which the support arm includes a rail assembly comprising:
- a support arm mount adaptor;
- a support rail secured to the support arm by the mount adaptor and having spaced apart parallel receiver slots along the length thereof; and
- at least one display device mounting bracket having upper and lower, fixed position, slot engagement profiles, in which the support arm mount adaptor lockingly engages the display device mount interface of the display mounting head of a support arm without modification and ensures full positional functionality of the support arm.

14. A display device support arm as claimed in claim 13, in which the display device mounting bracket comprises:
- a first part having said slot engagement profiles for engaging the spaced apart receiver slots of the support rail and a locking nut to engage and release a second part which is pivotally attached to the first part adjacent the lower of said slot engagement profiles to facilitate pitch angle (tilt) adjustment of a display device attached to the mounting bracket via a third part which includes a display device mount interface and a stud element rotatably secured within a stud receiver of said second part.

15. A display device support arm as claimed in claim 1, which includes at least one constant friction joint comprising:
- a first body portion having a threaded aperture, a locking surface and a bearing surface;
- a second body portion rotatably movable with respect to the first body portion and having an unthreaded aperture about which, on an interior peripheral land thereof, has a bearing surface corresponding to the bearing surface of the first body portion, and, on an exterior peripheral land thereof, has a first load bearing washer and a second spring washer; and
- a shoulder bolt defining an inferior shoulder adapted to lock against the locking surface of the first body portion and a superior shoulder adapted to bear against the spring washer so as to transfer a constant force against the exterior peripheral land and thereby provide a constant rotational friction within the joint irrespective of component wear over product lifetime.

16. A method of installing a plurality of display device support arms of the type claimed in claim 1, the method including:
- mounting a securing component to a stable surface;
- fixing a first support arm element to the securing component and mounting via a rotary joint a second support arm element thereto, the second support arm element having a coupling mechanism at one end thereof which includes a load biasing actuator;
- pre-loading the load biasing actuator of the coupling mechanism to control the movement of the second support arm element under load;
- noting the load setting on an indicator provided on the coupling mechanism;
- mounting via a rotary joint a display mounting head having associated therewith a display device mount interface, the display mounting head further comprising a tilt mechanism having an arcuate surface and trigger-released locking blocks;

noting a selected tilt angle;

selecting one of a single display device having a VESA mount associated therewith for receiving the mount interface of the display mounting head or a support arm mount adaptor for locking a rail assembly having two or more display device mounting brackets attached thereto, each bracket having display device mount interfaces for engaging corresponding VESA mounts of respective display devices;

where a rail assembly is used, noting the tilt angles of the respective brackets;

securing the assembled support arm to the securing component; and repeating the above actions for each display device support arm of the installation, utilising the established tilt angles and load settings.

17. A method of installing a plurality of display device support arms as claimed in claim 16, in which the first and second support arm elements are pre-assembled.

18. A method of adjusting the pitch angle (tilt) of a display device, the method comprising:

providing a tilt mechanism within a display mounting head adapted to secure a display device on a display device support arm, the mechanism having a toothed arcuate surface and an axially disposed pivot, on which there is mounted for rotation therewith a display device mount interface and a spring trigger adapted to move one of at least two toothed locking blocks out of biased engagement with the toothed arcuate surface to facilitate said rotational movement, operating the spring trigger to disengage the locking block from the toothed arcuate surface;

manually positioning the display device to the required pitch angle; and releasing the spring trigger to re-engage one of the locking blocks with the arcuate toothed surface, in which the toothed arcuate surface is centrally axially disposed along the pivot and each toothed block is angularly offset from the other so that, upon release of the trigger, one block only engages its corresponding part of the toothed arcuate surface.

* * * * *